United States Patent
Ray Chaudhuri et al.

(10) Patent No.: US 11,758,465 B2
(45) Date of Patent: Sep. 12, 2023

(54) REPEATER BEACON SIGNAL FOR ENABLING INTER-CELL INTERFERENCE COORDINATION

(71) Applicant: QUALCOMM Incorporated, San Diego, CA (US)

(72) Inventors: Kausik Ray Chaudhuri, San Diego, CA (US); Atanu Basudeb Halder, San Diego, CA (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/123,066

(22) Filed: Dec. 15, 2020

(65) Prior Publication Data

US 2021/0185588 A1    Jun. 17, 2021

Related U.S. Application Data

(60) Provisional application No. 62/949,304, filed on Dec. 17, 2019.

(51) Int. Cl.
*H04W 40/24*    (2009.01)
*H04W 88/14*    (2009.01)
(Continued)

(52) U.S. Cl.
CPC ..... *H04W 40/244* (2013.01); *H04W 72/0446* (2013.01); *H04W 72/0453* (2013.01);
(Continued)

(58) Field of Classification Search
CPC ........... H04W 40/244; H04W 72/0426; H04W 72/0446; H04W 72/0453; H04W 74/0833;
(Continued)

(56) References Cited

U.S. PATENT DOCUMENTS 7,639,660 B2 *  12/2009  Kim .................. H04L 1/005
                                              455/433
9,026,037 B2 *   5/2015  Sawai ................ H04W 72/082
                                              455/7
(Continued)

FOREIGN PATENT DOCUMENTS

DE    20314560 U1 *  1/2004  ............. H04B 7/022
EP     3468065 A1      4/2019
(Continued)

OTHER PUBLICATIONS

Kishiyama et al.; NTT Docomo: Heterogeneous Network Capacity Expansion Technology for Further Development of LTE/LTE-Advanced; 2013.*

(Continued)

*Primary Examiner* — Jay P Patel
(74) *Attorney, Agent, or Firm* — Holland & Hart LLP/Qualcomm Incorporated

(57) ABSTRACT

Methods, systems, and devices for wireless communications are described. A repeater may transmit a beacon signal that indicates a presence of the repeater, where the repeater is configured to repeat signals to one or more user equipments (UEs) within a wireless communications system. The repeater may receive a signal from at least one base station within a time-frequency resource that is shared by a plurality of neighboring base stations in response to transmitting the beacon signal. The repeater may transmit an amplified version of the received signal to the one or more UEs.

28 Claims, 16 Drawing Sheets

(51) Int. Cl.
  *H04W 72/0453* (2023.01)
  *H04W 74/08* (2009.01)
  *H04W 72/0446* (2023.01)
  *H04W 72/27* (2023.01)

(52) U.S. Cl.
  CPC ....... *H04W 72/27* (2023.01); *H04W 74/0833* (2013.01); *H04W 88/14* (2013.01)

(58) Field of Classification Search
  CPC ... H04W 88/14; H04W 40/22; H04W 84/047; H04B 7/0617; H04B 7/15528; H04J 11/005; H04L 5/0091; H04L 5/0035
  See application file for complete search history.

(56) References Cited

U.S. PATENT DOCUMENTS

| | | | | |
|---|---|---|---|---|
| 10,310,051 | B2* | 6/2019 | Kim | H04W 64/00 |
| 2004/0058712 | A1* | 3/2004 | Rudolf | H04B 7/022 |
| | | | | 455/562.1 |
| 2005/0135324 | A1* | 6/2005 | Kim | H04L 1/005 |
| | | | | 370/343 |
| 2007/0042784 | A1* | 2/2007 | Anderson | H04L 5/0073 |
| | | | | 455/500 |
| 2010/0284447 | A1* | 11/2010 | Gore | H04L 25/0226 |
| | | | | 375/232 |
| 2010/0285738 | A1* | 11/2010 | Howard | H04L 27/2613 |
| | | | | 455/9 |
| 2011/0053495 | A1 | 3/2011 | Hara et al. | |
| 2011/0116392 | A1* | 5/2011 | Barriac | H04L 25/022 |
| | | | | 370/252 |
| 2011/0116531 | A1* | 5/2011 | Gore | H04B 7/15585 |
| | | | | 375/213 |
| 2011/0228712 | A1* | 9/2011 | Anderson | H04L 5/14 |
| | | | | 370/335 |
| 2012/0044836 | A1* | 2/2012 | Sivavakeesar | H04W 24/02 |
| | | | | 370/255 |
| 2012/0207079 | A1* | 8/2012 | Wang | H04W 28/0284 |
| | | | | 370/315 |
| 2013/0021932 | A1* | 1/2013 | Damnjanovic | H04W 52/0209 |
| | | | | 370/252 |
| 2013/0201848 | A1* | 8/2013 | Kazmi | H04W 48/16 |
| | | | | 370/252 |
| 2014/0094188 | A1* | 4/2014 | Kazmi | H04W 4/023 |
| | | | | 455/456.1 |
| 2014/0140295 | A1* | 5/2014 | Manssour | H04W 72/1205 |
| | | | | 370/329 |
| 2014/0192690 | A1 | 7/2014 | Chakraborty et al. | |
| 2014/0194124 | A1* | 7/2014 | Xiao | H04L 25/03949 |
| | | | | 455/437 |
| 2014/0254537 | A1* | 9/2014 | Kim | H04W 52/32 |
| | | | | 370/329 |
| 2014/0269548 | A1* | 9/2014 | Lim | H04L 1/0026 |
| | | | | 370/329 |
| 2015/0011233 | A1* | 1/2015 | Kazmi | H04W 72/044 |
| | | | | 455/454 |
| 2015/0208408 | A1* | 7/2015 | Berggren | H04L 1/1812 |
| | | | | 370/329 |
| 2016/0099761 | A1* | 4/2016 | Chen | H04B 7/024 |
| | | | | 370/336 |
| 2016/0278040 | A1* | 9/2016 | Siomina | G01S 5/0072 |
| 2016/0295494 | A1* | 10/2016 | Gulati | H04W 72/085 |
| 2016/0381690 | A1* | 12/2016 | Kim | H04W 72/08 |
| | | | | 370/329 |
| 2017/0111952 | A1 | 4/2017 | Choi | |
| 2019/0306867 | A1* | 10/2019 | Cirik | H04W 72/0453 |
| 2019/0327012 | A1* | 10/2019 | Park | H04W 24/08 |
| 2019/0361111 | A1* | 11/2019 | Sadiq | H04B 7/0695 |
| 2019/0380152 | A1* | 12/2019 | Abedini | H04W 4/40 |
| 2019/0394082 | A1* | 12/2019 | Cirik | H04W 76/28 |
| 2020/0137821 | A1* | 4/2020 | Cirik | H04B 7/063 |
| 2020/0145280 | A1* | 5/2020 | Cirik | H04W 72/0413 |
| 2020/0229271 | A1* | 7/2020 | You | H04W 56/001 |
| 2020/0351801 | A1* | 11/2020 | Jeon | H04W 52/48 |
| 2021/0022182 | A1* | 1/2021 | Mondal | H04W 88/06 |
| 2021/0075497 | A1* | 3/2021 | Tekgul | H04W 40/22 |
| 2021/0168632 | A1* | 6/2021 | Lee | H04B 17/345 |
| 2021/0168648 | A1* | 6/2021 | Lee | H04W 4/40 |
| 2021/0194756 | A1* | 6/2021 | Babaei | H04L 41/0654 |
| 2021/0203406 | A1* | 7/2021 | Tekgul | H04B 7/15557 |
| 2021/0227508 | A1* | 7/2021 | Lee | H04W 74/0816 |
| 2021/0321370 | A1* | 10/2021 | Lee | H04W 72/02 |
| 2021/0323580 | A1* | 10/2021 | Lee | B60W 60/001 |
| 2021/0360549 | A1* | 11/2021 | Lee | H04W 56/006 |
| 2021/0400509 | A1* | 12/2021 | Lee | H04W 4/40 |
| 2021/0400634 | A1* | 12/2021 | Lee | H04W 92/18 |
| 2022/0022065 | A1* | 1/2022 | Wang | H04W 24/08 |
| 2022/0095278 | A1* | 3/2022 | Kim | H04L 5/00 |
| 2022/0123816 | A1* | 4/2022 | El-Keyi | H04B 7/0695 |

FOREIGN PATENT DOCUMENTS

| | | | | |
|---|---|---|---|---|
| WO | WO-2010132475 | A2* | 11/2010 | H04B 7/15585 |
| WO | WO-2013010014 | A1* | 1/2013 | H04W 48/12 |
| WO | WO-2015070905 | A1* | 5/2015 | H04W 52/243 |
| WO | WO-2020032765 | A1* | 2/2020 | H04W 72/02 |

OTHER PUBLICATIONS

3GPP TSG RAN WG1 Meetings: R1-074110; Improving cell-edge performance by Inter-Cell Interference Coordination.*
3GPP TSG RAN WG1 Meetings: R1-074380; Oct. 2007 On Inter-cell Interference Coordination Schemes without/with Traffic Load Indication.*
Shah et al.; Feb. 2016; Coordinated Inter Cell Interference Avoidance Techniques and Performance Parameters for Cross Layer Interference in LTE-A Network.*
International Search Report and Written Opinion—PCT/US2020/065305—ISA/EPO—dated Jun. 8, 2021.
Partial International Search Report—PCT/US2020/065305—ISA/EPO—dated Apr. 16, 2021.

* cited by examiner

REPEATER BEACON SIGNAL FOR ENABLING INTER-CELL INTERFERENCE COORDINATION

CROSS REFERENCE

The present application for patent claims the benefit of U.S. Provisional Patent Application No. 62/949,304 by RAY CHAUDHURI et al., entitled "ENABLE REPEATER IDENTIFICATION AND INTER-CELL INTERFERENCE COORDINATION SUPPORT TO REDUCE REPEATER BASED INTERFERENCE," filed Dec. 17, 2019, assigned to the assignee hereof, and expressly incorporated herein.

BACKGROUND

The following relates generally to wireless communications, and more specifically to a repeater beacon signal for enabling inter-cell interference coordination (ICIC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support a repeater beacon signal for enabling inter-cell interference coordination (ICIC). Generally, the described techniques provide various mechanisms that support wireless communications in a wireless network. Broadly, aspects of the described techniques implement a detection capability within a repeater deployed in a wireless communication system, such as a cellular network. Cellular networks use repeaters to extend and/or improve the coverage area. Some repeaters are integrated components of the network with fully connected protocol stacks implemented with other network devices. However, some repeaters are not fully integrated into the networks but, instead, simply amplify received signals for retransmission. The repeater (e.g., a repeater that is not integrated into the cellular network) may be configured to send out a beacon signal either periodically or aperiodically, either in-band or out-of-band, that identifies the repeater. The beacon may serve to indicate the presence of the repeater within the wireless communication system. Base stations (or cells) receiving the beacon may initiate ICIC exchanges (e.g., via a backhaul link) to identify/allocate resources (e.g., time and/or frequency resources) in which communications involving the repeater may be performed. Accordingly, the ICIC may prevent multiple base stations from transmitting to the repeater at the same time/using the same frequency and/or prevent the repeater from being heard by the multiple base stations.

A method of wireless communication at a repeater is described. The method may include transmitting, by the repeater, a beacon signal that indicates a presence of the repeater, where the repeater is configured to repeat signals to one or more user equipments (UEs) within a wireless communications system, receiving a signal from at least one base station within a time-frequency resource that is shared by a set of neighboring base stations in response to transmitting the beacon signal, and transmitting an amplified version of the received signal to the one or more UEs.

An apparatus for wireless communication at a repeater is described. The apparatus may include a processor, memory coupled with the processor, and instructions stored in the memory. The instructions may be executable by the processor to cause the apparatus to transmit, by the repeater, a beacon signal that indicates a presence of the repeater, where the repeater is configured to repeat signals to one or more UEs within a wireless communications system, receive a signal from at least one base station within a time-frequency resource that is shared by a set of neighboring base stations in response to transmitting the beacon signal, and transmit an amplified version of the received signal to the one or more UEs.

Another apparatus for wireless communication at a repeater is described. The apparatus may include means for transmitting, by the repeater, a beacon signal that indicates a presence of the repeater, where the repeater is configured to repeat signals to one or more UEs within a wireless communications system, receiving a signal from at least one base station within a time-frequency resource that is shared by a set of neighboring base stations in response to transmitting the beacon signal, and transmitting an amplified version of the received signal to the one or more UEs.

A non-transitory computer-readable medium storing code for wireless communication at a repeater is described. The code may include instructions executable by a processor to transmit, by the repeater, a beacon signal that indicates a presence of the repeater, where the repeater is configured to repeat signals to one or more UEs within a wireless communications system, receive a signal from at least one base station within a time-frequency resource that is shared by a set of neighboring base stations in response to transmitting the beacon signal, and transmit an amplified version of the received signal to the one or more UEs.

Some examples of the method, apparatuses, and non-transitory computer-readable medium described herein may further include operations, features, means, or instructions for receiving a beacon configuration for transmission of the beacon signal, where the beacon signal may be transmitted in accordance with the beacon configuration.

In some examples of the method, apparatuses, and non-transitory computer-readable medium described herein, receiving the beacon configuration further may include operations, features, means, or instructions for receiving the beacon configuration that indicates to transmit the beacon signal in accordance with a periodic schedule, an aperiodic schedule, or any combination thereof.

In some examples of the method, apparatuses, and non-transitory computer-readable medium described herein, receiving the beacon configuration further may include operations, features, means, or instructions for receiving the beacon configuration that indicates to transmit the beacon signal as at least one of an in-band transmission, or an out-of-band transmission, or any combination thereof.

In some examples of the method, apparatuses, and non-transitory computer-readable medium described herein, receiving the beacon configuration further may include operations, features, means, or instructions for receiving the beacon configuration that indicates to transmit the beacon signal as a random access channel (RACH) preamble within a RACH resource of the wireless communications system.

Some examples of the method, apparatuses, and non-transitory computer-readable medium described herein may further include operations, features, means, or instructions for transmitting the beacon signal that includes an identifier associated with the repeater.

In some examples of the method, apparatuses, and non-transitory computer-readable medium described herein, the repeater may be not configured to decode or process the received signal before transmission.

In some examples of the method, apparatuses, and non-transitory computer-readable medium described herein, the repeater may be configured to amplify and beamform the signal without coordination with the at least one base station or any of the plurality of neighboring base stations of the wireless communications system.

A method of wireless communication at a base station is described. The method may include receiving, from a repeater, a beacon signal that indicates presence of the repeater, performing, in response to receiving the beacon signal, inter-cell interference coordination with one or more neighboring base stations that received the beacon signal to coordinate scheduling of a time-frequency resource, and transmitting, within the time-frequency resource, a signal to the repeater for repeating to one or more UEs based on the inter-cell interference coordination.

An apparatus for wireless communication at a base station is described. The apparatus may include a processor, memory coupled with the processor, and instructions stored in the memory. The instructions may be executable by the processor to cause the apparatus to receive, from a repeater, a beacon signal that indicates presence of the repeater, perform, in response to receiving the beacon signal, inter-cell interference coordination with one or more neighboring base stations that received the beacon signal to coordinate scheduling of a time-frequency resource, and transmit, within the time-frequency resource, a signal to the repeater for repeating to one or more UEs based on the inter-cell interference coordination.

Another apparatus for wireless communication at a base station is described. The apparatus may include means for receiving, from a repeater, a beacon signal that indicates presence of the repeater, performing, in response to receiving the beacon signal, inter-cell interference coordination with one or more neighboring base stations that received the beacon signal to coordinate scheduling of a time-frequency resource, and transmitting, within the time-frequency resource, a signal to the repeater for repeating to one or more UEs based on the inter-cell interference coordination.

A non-transitory computer-readable medium storing code for wireless communication at a base station is described. The code may include instructions executable by a processor to receive, from a repeater, a beacon signal that indicates presence of the repeater, perform, in response to receiving the beacon signal, inter-cell interference coordination with one or more neighboring base stations that received the beacon signal to coordinate scheduling of a time-frequency resource, and transmit, within the time-frequency resource, a signal to the repeater for repeating to one or more UEs based on the inter-cell interference coordination.

Some examples of the method, apparatuses, and non-transitory computer-readable medium described herein may further include operations, features, means, or instructions for transmitting a beacon configuration for transmission of the beacon signal, where the beacon signal may be transmitted in accordance with the beacon configuration.

In some examples of the method, apparatuses, and non-transitory computer-readable medium described herein, transmitting the beacon configuration further may include operations, features, means, or instructions for transmitting the beacon configuration that indicates to transmit the beacon signal in accordance with a periodic schedule, an aperiodic schedule, or any combination thereof.

In some examples of the method, apparatuses, and non-transitory computer-readable medium described herein, transmitting the beacon configuration further may include operations, features, means, or instructions for transmitting the beacon configuration that indicates to transmit the beacon signal as at least one of an in-band transmission, or an out-of-band transmission, or any combination thereof.

In some examples of the method, apparatuses, and non-transitory computer-readable medium described herein, transmitting the beacon configuration further may include operations, features, means, or instructions for transmitting the beacon configuration that indicates to transmit the beacon signal as a RACH preamble within a RACH resource of a wireless communications system.

Some examples of the method, apparatuses, and non-transitory computer-readable medium described herein may further include operations, features, means, or instructions for receiving an indication from a first base station of the one or more neighboring base stations indicating that the first base station received the beacon signal from the repeater, where the inter-cell interference coordination may be based on the received indication.

In some examples of the method, apparatuses, and non-transitory computer-readable medium described herein, performing the inter-cell interference coordination may include operations, features, means, or instructions for communicating one or more messages with the one or more neighboring base stations via at least one of a wired backhaul link, or a wireless backhaul link, or any combination thereof.

DETAILED DESCRIPTION

Figure 1:
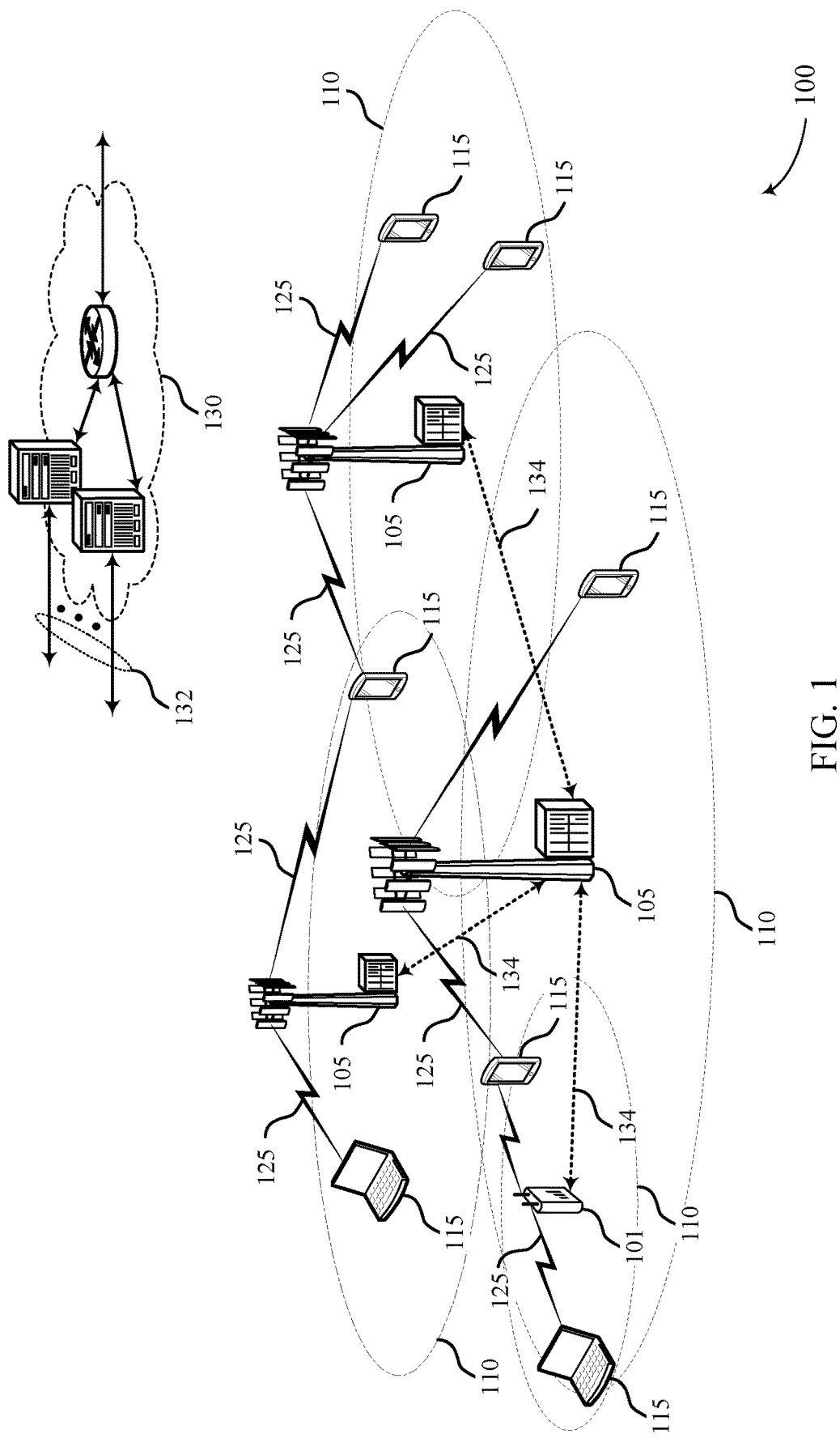
FIG. 1 illustrates an example of a system for wireless communications that supports a repeater beacon signal for enabling inter-cell interference coordination in accordance with aspects of the present disclosure.

Wireless networks may be deployed in an overlapping manner. For example, base stations (e.g., cells) of a cellular network may be deployed within a geographic area to provide wireless communications with user equipment (UE). Typically, the wireless devices within the cellular network maintain logical connections (e.g., at the protocol stack layer) with each other in order to coordinate resource utilization, synchronization, interference management, and the like. Some cellular networks even utilize various relay nodes that operate as repeaters within the cellular network in order to extend the coverage area, provide wireless backhaul services, etc. These relay nodes are typically integrated into the network using logical connections, e.g., at the protocol stack layer, and the like. That is, these relay nodes performing repeater operations are generally known by the other components within the cellular network and operate according to full network coordination and control.

However, some deployment scenarios may include a different class of repeaters that are not necessarily known by the cellular network. That is, this low cost/low complexity class of repeaters do not establish any sort of a logical connection with other devices within the cellular network, and therefore did not operate according to the resources and/or configurations provided by the cellular network. Instead, this class of repeaters simply detect a wireless signal, amplify that signal, and then retransmit the signal. Thus, this class of repeaters provides a low cost and simplified mechanism to extend the coverage area of a cellular network, e.g., within buildings or other such structures. However, such ad hoc deployment (e.g., without any sort of network control configuration) of such repeaters may introduce interference into the cellular network. It is to be understood that references to a repeater performing aspects of the described techniques refers to this low cost/low complexity class of repeaters. Moreover, the wireless devices of the cellular network may not even know that the repeater has been deployed or is otherwise operating within the coverage area of the cellular network.

Aspects of the disclosure are initially described in the context of a wireless communications system. Aspects of the described techniques provide various mechanisms that support wireless communications in a wireless network. Broadly, aspects of the described techniques implement a detection capability within a repeater deployed in a wireless communication system, such as a cellular network. Cellular networks use repeaters to extend and/or improve the coverage area. Some repeaters are integrated components of the network with fully connected protocol stacks implemented with other network devices. However, some repeaters are not fully integrated into the networks but, instead, simply amplify received signals for retransmission. The repeater (e.g., a repeater that is not integrated into the cellular network) may be configured to send out a beacon signal either periodically or aperiodically, either in-band or out-of-band, that identifies the repeater. The beacon may serve to indicate the presence of the repeater within the wireless communication system. Base stations (or cells) receiving the beacon may initiate inter-cell interference coordination (ICIC) exchanges (e.g., via a backhaul link) to identify/allocate resources (e.g., time and/or frequency resources) in which communications involving the repeater may be performed. Accordingly, the ICIC may prevent multiple base stations from transmitting to the repeater at the same time/using the same frequency and/or prevent the repeater from being heard by the multiple base stations.

Particular aspects of the subject matter described herein may be implemented to realize one or more advantages. The described techniques may support improvements in system efficiency such that a device (e.g., the base stations) may eliminate or mitigate interference caused within the wireless communications system by the repeater. The described techniques may also promote enhanced capabilities of the device by enabling the repeater to announce its presence within the wireless communication system, but without requiring the repeater to be integrated into the wireless communication system. As such, supported techniques may include improved device operations and, in some examples, may promote device and network efficiencies, among other benefits.

Aspects of the disclosure are further illustrated by and described with reference to apparatus diagrams, system diagrams, and flowcharts that relate to a repeater beacon signal for enabling inter-cell interference coordination.

FIG. 1 illustrates an example of a wireless communications system 100 that supports enabling repeater identification and inter-cell interference coordination support to reduce repeater based interference in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, wireless communication system 100 may include one or more repeaters 101 deployed and operating within wireless communication system 100. The repeater 101 may be an example of a cell phone signal booster deployed outside of the context of wireless communication system 100 (e.g., may be deployed in an ad hoc manner by end users rather than a network operator associated with wireless communication system 100). The repeater 101 may not establish a logical connectivity at a protocol stack layer with other devices of wireless communication system 100. Generally, the repeater 101 may receive a signal (e.g., an ingress signal), amplify that signal, and then transmit an amplified version of the signal. The repeater 101 may not generally be configured to encode and/or decode the signal, beyond the limited techniques described herein.

The repeater 101 deployed and operating within wireless communication system 100 may transmit a beacon signal that indicates a presence of the repeater 101 within wireless communications system 100. The repeater 101 may receive a signal from at least one base station 105 within a time-frequency resource that is shared by a plurality of neighboring base stations 105 in response to transmitting the beacon signal. The repeater 101 may transmit an amplified version of the received signal to the one or more UEs 115.

A base station 105 may receive, from a repeater 101, a beacon signal that indicates presence of the repeater 101 that is repeating signals to one or more UEs 115 within a wireless communications system. The base station 105 may perform, in response to receiving the beacon signal, inter-cell interference coordination with one or more neighboring base stations 105 that received the beacon signal to coordinate scheduling of a time-frequency resource. The base station 105 may transmit, within the time-frequency resource, a signal to the repeater for repeating to the one or more UEs 115 based at least in part on the inter-cell interference coordination.

Figure 2:
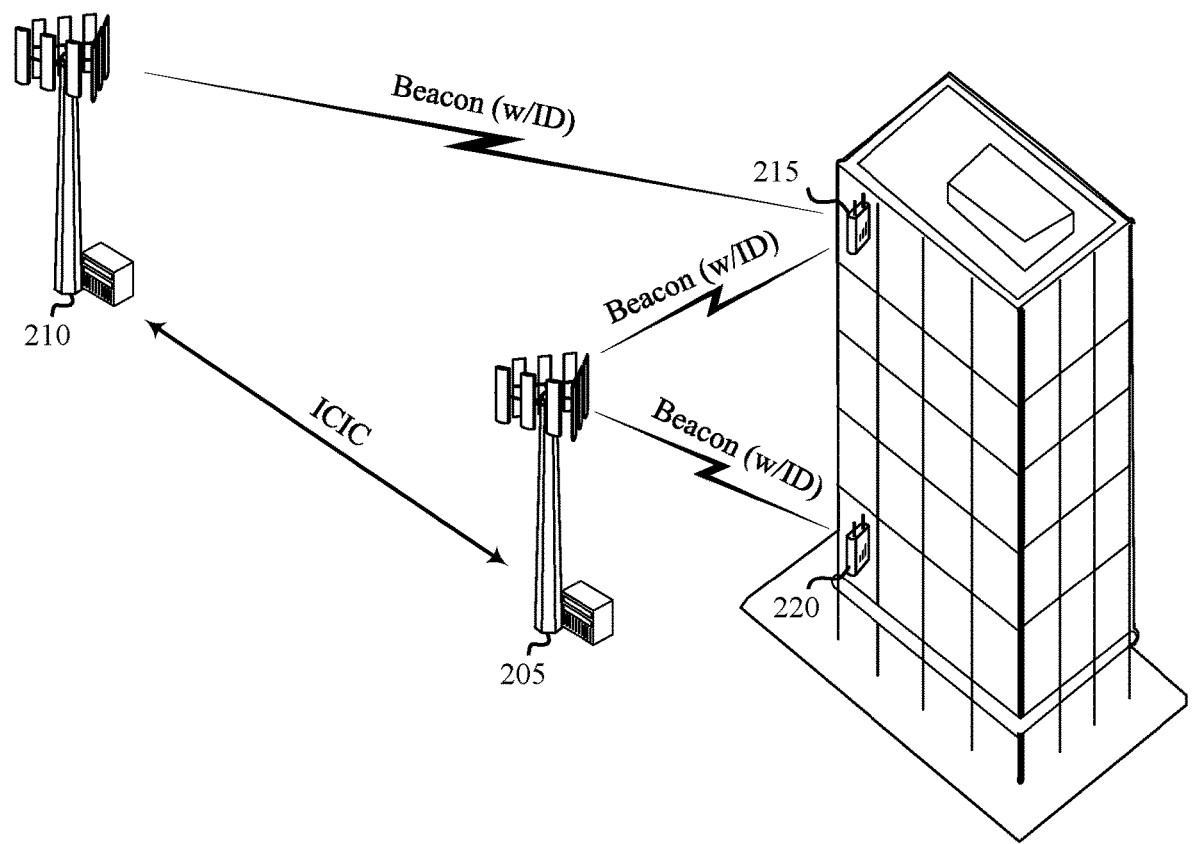
FIG. 2 illustrates an example of a wireless communication system that supports a repeater beacon signal for enabling inter-cell interference coordination in accordance with aspects of the present disclosure.

FIG. 2 illustrates an example of a wireless communication system 200 that supports enabling repeater identification and inter-cell interference coordination support to reduce repeater based interference in accordance with aspects of the present disclosure. In some examples, wireless communication system 200 may implement aspects of wireless communication system 100. Wireless communication system 200 may include a first cell 205, a second cell 210, a first repeater 215, and a second repeater 220, which may be examples of the corresponding devices described herein. In some aspects, the first cell 205 and/or the second cell 210 may be examples of a base station, as described herein.

It is to be understood that the first repeater 215 and the second repeater 220 are low complexity, low cost repeaters operating within the coverage area of wireless communication system 200, but not otherwise integrated into wireless communication system 200. That is, the first repeater 215 and the second repeater 220 do not maintain any sort of logical connectivity, e.g., do not establish a logical entity status via one or more protocol stack layers, with the wireless devices and/or core network of wireless communication system 200. The first repeater 215 and the second repeater 220 may be configured to simply receive a signal from any device, amplify that signal, and then transmit the signal (e.g., repeat the signal by transmitting an amplified version of the signal). These functions are performed without coordination from the first cell 205 and/or the second cell 210, from any core network function of wireless communication system 200, and the like. The first repeater 215 and the second repeater 220 are not synchronized in the time domain with wireless communication system 200, are not allocated any particular time/frequency/code/spatial resources configured by wireless communication system 200, and the like. The first repeater 215 and the second repeater 220 may be low complexity devices when compared to wireless devices of communication system 200, e.g., may have fewer hardware/software functionality.

Accordingly, the first repeater 215 and the second repeater 220 are different from other devices of wireless communication system 200 that may also act as repeaters, at least to some degree. For example, the first repeater 215 and second repeater 220 are not the same as a relay node that is a part of wireless communication system 200, e.g., such as a relay node within an integrated access and backhaul (IAB) network. As another example, the first repeater 215 and the second repeater 220 are not the same as a relay node that may be a part of a mesh network operating within wireless communication system 200. Accordingly, the first repeater 215 and the second repeater 220 may be deployed without notification, coordination, or control by network operators and/or components/functions of wireless communication system 200. This may greatly reduce the costs and/or complexity when deploying the first repeater 215 and the second repeater 220. Accordingly, the first cell 205 and/or the second cell 210 may not typically know that the first repeater 215 and/or the second repeater 220 are deployed within their coverage area.

In some aspects, the first repeater 215 and the second repeater 220, not being configured by and/or controlled by wireless communication system 200, are deployed in an ad hoc manner to extend the coverage area of wireless communication system 200. In the example illustrated in FIG. 2, this may include the first repeater 215 being deployed on a top floor of a building to enhance the coverage for wireless devices (e.g., UEs) on the top floor(s) of the building. In another example, this may include the second repeater 220 being deployed on a lower floor of the building to enhance the coverage for wireless devices on the lower floor(s) of the building. For example, the first repeater 215 may be deployed to improve communications between UEs on the top floor(s) and the first cell 205 and/or the second cell 210 of wireless communication system 200. Similarly, the second repeater 220 may be deployed to support communications between UEs on the lower floor(s) and the first cell 205 and/or the second cell 210 of wireless communication system 200. More specifically, the first repeater 215 and the second repeater 220 deployed within the building may receive signals (ingress signals) transmitted by the first cell 205 and/or second cell 210, amplify those signals, and retransmit the amplified signals at a higher power level to improve reception by the UEs on the respective floors. Similarly, the first repeater 215 and the second repeater 220 deployed within the building may receive signals (ingress signals) transmitted by UEs on the respective floors, amplify those signals, and retransmit the amplified signals at a higher power level to improve reception by the first cell 205 and/or the second cell 210.

Generally, deployment of the first repeater 215 and/or the second repeater 220 provides a low cost mechanism whereby individual users (rather than the network operators of wireless communication system 200) can deploy a low cost, low complexity repeater to improve cellular communications within the building, but without having to coordinate with the network operator of wireless communication system 200, obtain access rights to use certain frequencies, etc. Typically, this approach may be acceptable in many circumstances as it improves communication capabilities within the coverage area of the repeater. However, widescale ad hoc deployment of the first repeater 215, the second repeater 220, and other repeaters may result in a deployment density such that interference may be introduced into and/or added to wireless communication system 200. Moreover, the wireless devices within the wireless communication system 200 (e.g., the first cell 205 and/or the second cell 210).

For example, the first repeater 215 may be deployed in a higher floor, which may provide a close line of sight for the first cell 205, but may provide a far off line of sight with respect to the second cell 210. This may support the first repeater 215 performing repeater operations for UEs served by the first cell 205 and/or the second cell 210 on the higher floor(s). The second repeater 220 may be deployed on a lower floor, which may provide a close line of sight for the first cell 205, but the second repeater 220 may be blocked from the second cell 210 as the first cell 205 is in the way. This may support the second repeater 220 performing repeater operations for UEs served by the first cell 205.

As discussed above, the deployment density for repeaters such as the first repeater 215 and/or the second repeater 220 may be high, e.g., attributable to the low cost/low complexity of such repeaters. This may cause or increase interference for wireless devices of wireless communication system 200, e.g., due to the fact that the devices of wireless communication system 200 may not be aware that the repeaters are deployed. For example, such low cost/low complexity repeaters may result in increased interference in both uplink and downlink communications by wireless devices of wireless communication system 200. This interference may be enhanced when such repeaters are installed on higher floors, such as the first repeater 215. That is, the first repeater 215 as well as the second repeater 220, in some examples, may introduce unwanted uplink/downlink interference. Some attempts to resolve this include physically orienting the antennas of the repeaters to avoid a line of sight with interfered/interfering devices, such as the second cell 210. If that attempt is unsuccessful, another attempt to resolve such interference may include restricting deployment of repeaters beyond a certain height, e.g., on higher floors of the building. However, these approaches are problematic and provide little benefit in interference avoidance and reduction.

Accordingly, aspects of the described techniques reduce interference associated with the first repeater 215 and/or the second repeater 220 by implementing a presence indication capability within the first repeater 215 and/or the second repeater 220. That is, the first repeater 215 and/or the second repeater 220 may each be configured to implement a presence indication capability to support interference mitigation. In some examples, the first repeater 215 and/or the second repeater 220 may be configured to repeat signals (e.g., beacon signals) to one or more UEs. For example, the first repeater 215 and/or the second repeater 220 may transmit a beacon signal that indicates the presence of the corresponding repeater. The beacon signal may be transmitted periodically (e.g., according to a schedule) and/or aperiodically. The beacon signal may be transmitted in an in-band transmission and/or an out-of-band transmission. In some examples, the beacon signal may be configured to carry or otherwise convey an indication of an identifier associated with the repeater transmitting beacon signal. For example, the first repeater 215 may transmit a beacon signal carrying or conveying an indication of a first identifier associated with the first repeater 215 (e.g., a bit sequence signature of the first repeater 215 that may be unique). The second repeater 220 may transmit the beacon signal carrying or conveying an indication of the second identifier associated with the second repeater 220.

Wireless devices operating within wireless communication system 200 may receive the beacon signals transmitted by any repeater within range and coordinate with each other in order to identify resources used in communications involving the repeater to avoid or mitigate interference.

For example, the first cell 205 and the second cell 210 may receive beacon signals transmitted from the first repeater 215 and/or the second repeater 220. Based on the received beacon signals, the first cell 205 and the second cell 210 may perform ICIC in order to identify or otherwise allocate resources used in communications involving the repeater(s). The ICIC may be performed via a wired or wireless backhaul connection, e.g., such as an X2 interface. In some aspects, the ICIC may include the first cell 205 and the second cell 210 identifying time and/or frequency resources that can be used for uplink and/or downlink communications between the respective cell and their associated UE that might involve the first repeater 215 and/or the second repeater 220. For example, the ICIC may identify a first set of time and/or frequency resources which the first cell 205 uses for communications involving the first repeater 215 and/or the second repeater 220 and a second set of time and/or frequency resources which the second cell 210 uses for communications involving the first repeater 215 and/or the second repeater 220, or vice versa. The first set of time and/or frequency resources may be distinct from, or may partially overlap with, the second set of time and/or frequency resources. In some examples, when the first set of time and/or frequency resources at least partially or completely overlaps with the second set of time and/or frequency resources, the first cell 205 and the second cell 210 may apply a coding scheme to generate their respective transmissions to enable a receiver, such as UE 115, to receive one or both transmissions from the respective cells 205, 210, within the at least partially overlapping set of time and/or frequency resources.

As one non-limiting example, the first cell 205 may communicate with an associated UE located on an upper floor of the building via the first repeater 215 and using the first set of time and/or frequency resources. As another non-limiting example, the first cell 205 may communicate with an associated UE located on a lower floor of the building via the second repeater 220 and using the second set of time and/or frequency resources. It is to be understood that the second cell 210 (and any other cells) may also be configured with a set of corresponding time and/or frequency resources which can be used for communications involving the first repeater 215 and/or the second repeater 220. The first and second set of resources may be nonoverlapping or partially overlapping resources in order to avoid interference for the communications.

In some examples, the techniques discussed above where the first repeater 215 and/or the second repeater 220 transmit beacon signals to indicate their presence within wireless communications system 200 may be performed autonomously. That is, the first repeater 215 and/or the second repeater 220 may individually and autonomously transmit the beacon signals in order to signal their presence within wireless communication system 200. In this example, the first cell 205 and the second cell 210 may perform the ICIC to identify the time and/or frequency resources to use for communications involving the first repeater 215 and/or the second repeater 220.

However, in other examples the techniques discussed above may be based on other signaling exchanged between the first cell 205 and/or the second cell 210 and the first repeater 215 and/or the second repeater 220. For example, the first cell 205 and/or the second cell 210 may transmit or otherwise convey an indication of a beacon configuration to the first repeater 215 and/or the second repeater 220. The first repeater 215 and/or the second repeater 220 may receive the beacon configuration and transmit the beacon signals in response and in accordance with the beacon configuration. In some examples, the beacon configuration to be transmitted is based on detecting an earlier beacon signal transmitted from the first repeater 215 and/or the second repeater 220, based on detecting the presence of the first repeater 215 and/or second repeater 220 using a different signal, and the like.

Broadly, the beacon configuration may configure one or more aspects of transmission of the beacon signals by the respective first repeater 215 and/or second repeater 220. For example, the beacon configuration may indicate, to the respective repeater, of whether the beacon signal is transmitted according to a periodic schedule and/or an aperiodic schedule, in an in-band transmission and/or in an out-of-band transmission, and the like. In some examples, the beacon configuration may carry or convey information identifying resources (e.g., time and/or frequency resources) in which the first repeater 215 and/or the second repeater 220 are to use for transmitting their respective beacon signals. For example, the beacon configuration may identify common or otherwise known resources, such as a random access channel (RACH) preamble within a RACH resource of the wireless communication system 200.

Accordingly, aspects of the described techniques provide a mechanism whereby the first repeater 215 and/or the second repeater 220 can signal their presence within wireless communication system 200 by transmitting a beacon signal. The components within wireless communication system 200 may use the beacon signal to perform ICIC (or any other interference detection, mitigation, and/or avoidance scheme) in order to eliminate or mitigate any interference associated with the first repeater 215 and/or the second repeater 220. This may be particularly helpful in a deployment density scenario where multiple repeaters are deployed within wireless communications system 200, thereby increasing the potential for interference.

Figure 3:
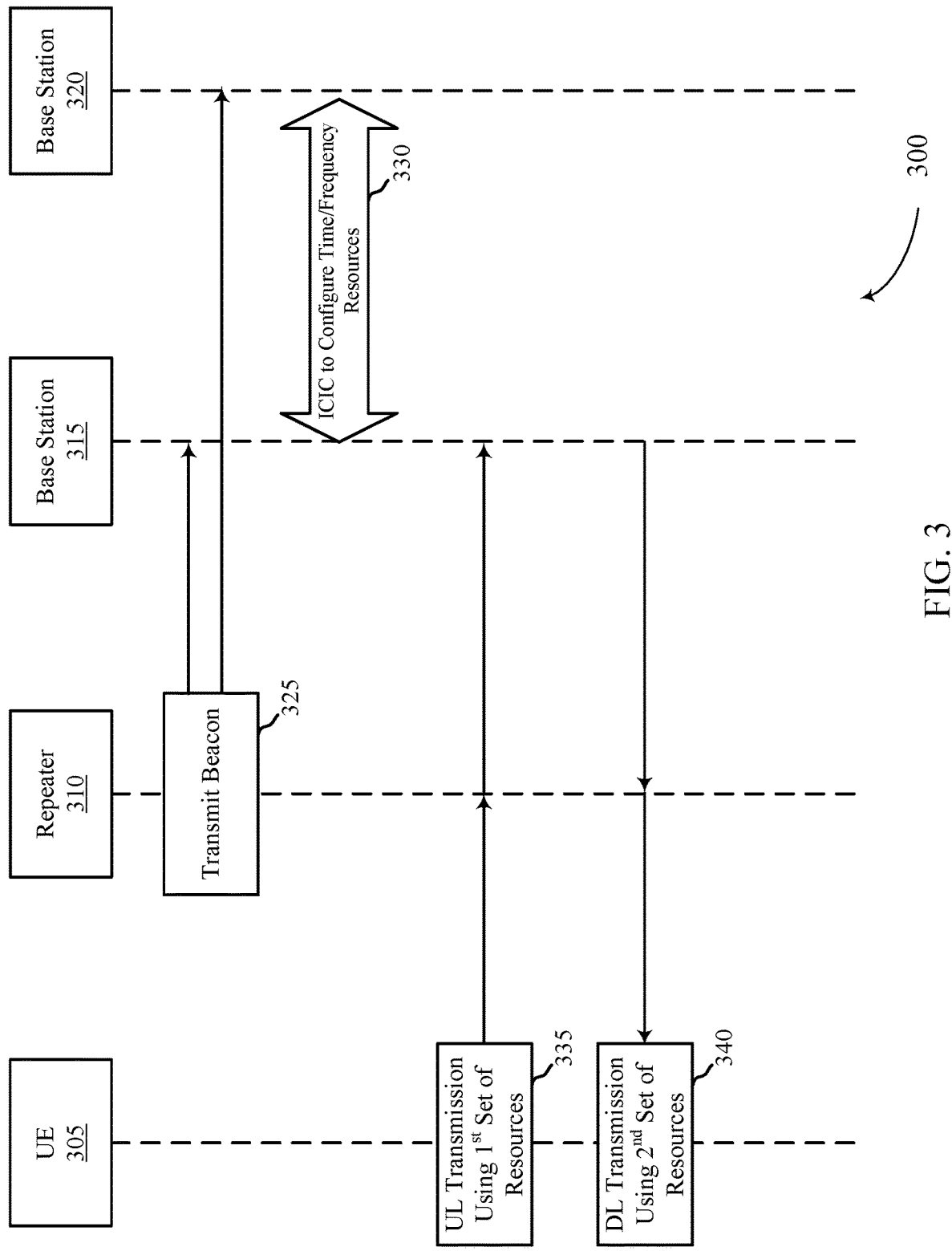
FIG. 3 illustrates an example of a process that supports a repeater beacon signal for enabling inter-cell interference coordination in accordance with aspects of the present disclosure.

FIG. 3 illustrates an example of a process 300 that supports enabling repeater identification and inter-cell interference coordination support to reduce repeater based interference in accordance with aspects of the present disclosure. In some examples, process 300 may implement aspects of wireless communication systems 100 and/or 200. Aspects of process 300 may be implemented by UE 305, repeater 310, base station 315, and/or base station 320, which may be an example of the corresponding device described herein. In some aspects, repeater 310 may be a low cost/low complexity repeater that receives a signal (an ingress signal) and then transmits an amplified version of the signal, e.g., without decoding, processing, and the like, of the signal. The signals received and retransmitted by the repeater 310 may be signals within a wireless communication system (e.g., a cellular network), but the repeater 310 may not be integrated into the wireless communication system (e.g., may not establish any logical connectivity with components in the cellular network).

At 305, the repeater 310 may transmit or otherwise convey an indication of a beacon signal that indicates (e.g., to base station 315, base station 320, etc.) the presence of the repeater 310 within a wireless communication system. In some aspects, the beacon signal being transmitted may indicate the presence of repeater 310 within the wireless communication system. In some aspects, the beacon signal may be configured with an identifier associated with repeater 310 to indicate the presence of repeater 310 within the wireless communication system.

In some aspects, the beacon signal may be transmitted according to a periodic schedule and/or an aperiodic schedule, in an in-band transmission and/or an out-of-band transmission, and the like. In some aspects, the beacon signal may be transmitted on resources known by the wireless devices of the wireless communication system, such as a RACH preamble within a RACH resource of the wireless communication system.

In some aspects, base station 315 and base station 320 may both receive the beacon signal transmitted by repeater 310. That is, base station 315 and base station 320 may be located within a defined proximity of repeater 310 such that transmissions from repeater 310 and/or base stations 315 and/or 320 may introduce, or add to, interference.

Accordingly and at 330, base station 315 and base station 320 may perform ICIC functions. That is, base station 315 and base station 320 may coordinate with each other over a wired and/or wireless backhaul link in order to quantify potential interference to or from repeater 310. In some aspects, this may include base station 315 transmitting a signal to base station 320 indicating that it has received the beacon signal from repeater 310. In some aspects, this may include base station 320 transmitting a signal to base station 315 indicating that it has received the beacon signal from repeater 310. In some aspects, the ICIC may be performed based on both base station 315 and base station 320 receiving the beacon signal.

The ICIC may include determining that the interference to or from repeater 310 exceeds a threshold and, therefore, identifying countermeasures to avoid or mitigate such interference. Although various anti-interference countermeasures may be deployed, one non-limiting example may include base station 315 and base station 320 identifying time and/or frequency resources to use for communications that avoid or mitigate such interference. For example, the time and/or frequency resources may be used by base station 315 for its communications, base station 320 for its communications, UE 305 or its communications, and/or for any communications which may include repeater 310. In some aspects, this may include a first set of time and/or frequency resources used for communications in one direction (e.g., for uplink communications) and a second set of time and/or frequency resources used for communications in the other direction (e.g., for downlink communications). In some aspects, this may include base station 315 scheduling a first set of resources used for uplink and/or downlink communications, and base station 320 scheduling a second set of resources used for uplink and/or downlink communications, where the first set of set of resources differ in time, frequency, or both, from the second set of resources.

Accordingly, the time and/or frequency resources may be used for a signal received by repeater 310 from base station 315, UE 305, and/or base station 320. Repeater 310 may receive the signal over the time and/or frequency resource, amplify the signal, and then transmit the amplified version of the received signal. Coordinating scheduling of transmissions within the time and/or frequency resources may result in less interference within the time and/or frequency resources.

As one example in an uplink scenario, at 335 UE 305 may transmit a signal to repeater 310 using the identified time and/or frequency resources. Repeater 310 may amplify the signal received from UE 305 and transmit the amplified version of the signal to base station 315.

In another example in a downlink scenario, at 340 base station 315 may transmit a signal to repeater 310 using the identified time and/or frequency resources. Repeater 310 may amplify the signal received from base station 315 and transmit the amplified version of the signal to UE 305.

As discussed above, in some examples the repeater 310 may coordinate with a base station before implementing the described techniques. For example, the repeater 310 may receive a beacon configuration for transmission of the beacon signal. The beacon configuration may configure one or more aspects of how repeater 310 transmits the beacon signal (e.g., identify resources for the beacon signal, identify scheduling information for the beacon signal, etc.). For example, the beacon configuration may identify the time and/or resources used for the beacon signal transmission, may configure the manner in which the beacon signal is transmitted, and the like. In some aspects, the beacon configuration may be received from a base station (e.g., base station 315) in response to the base station detecting a previously transmitted beacon signal. In some aspects, repeater 310 may wait for a beacon configuration before transmitting the beacon signal.

Figure 4:
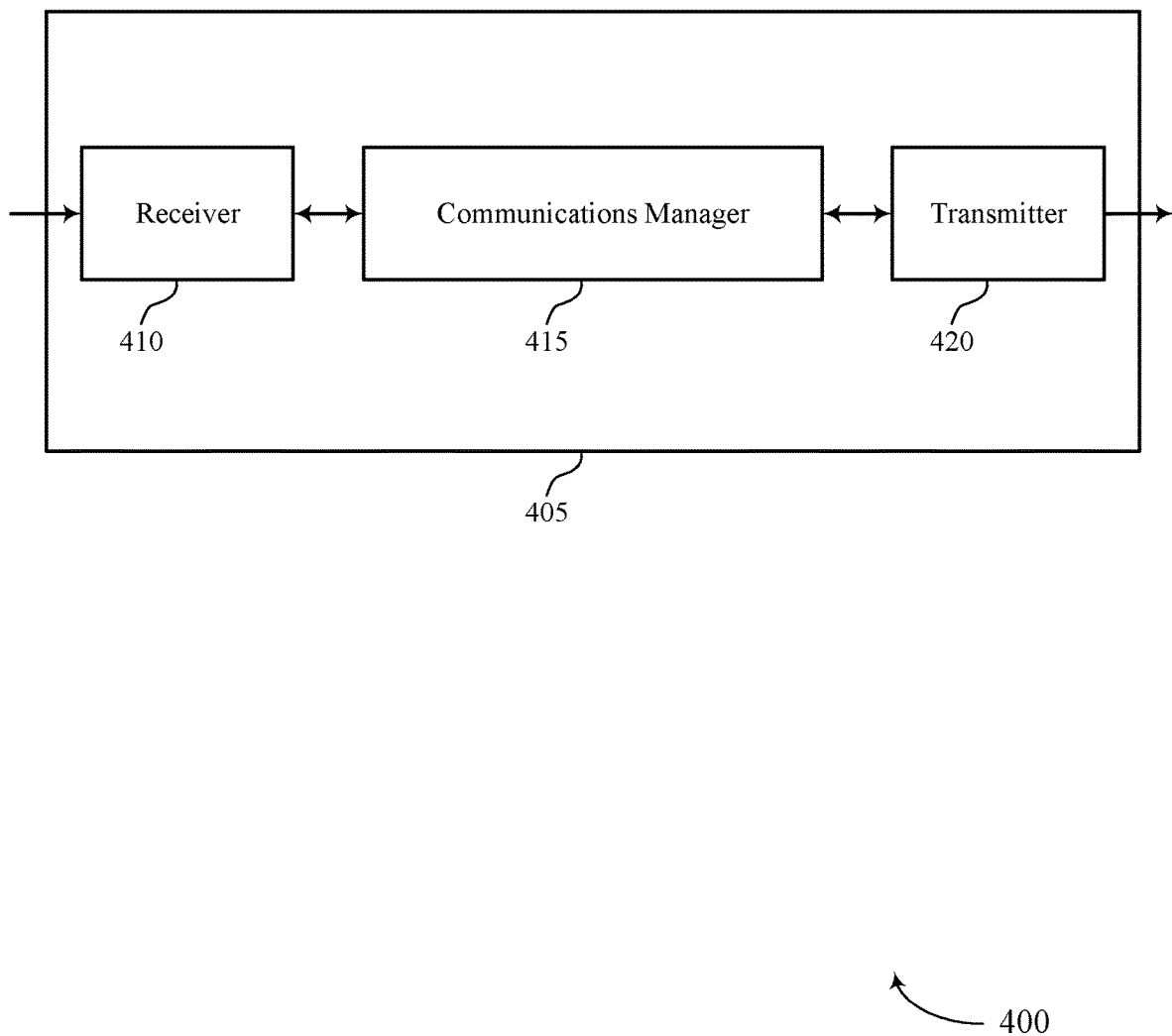
FIGS. 4 and 5 show block diagrams of devices that support a repeater beacon signal for enabling inter-cell interference coordination in accordance with aspects of the present disclosure.

FIG. 4 shows a block diagram 400 of a device 405 that supports enabling repeater identification and inter-cell interference coordination support to reduce repeater based interference in accordance with aspects of the present disclosure. The device 405 may be an example of aspects of a base station 105 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to a repeater beacon signals for enabling inter-cell interference coordination, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a repeater, a beacon signal that indicates presence of the repeater that is repeating signals to one or more UEs within a wireless communications system, perform, in response to receiving the beacon signal, inter-cell interference coordination with one or more neighboring base stations that received the beacon signal to coordinate scheduling of a time-frequency resource, and transmit a signal within the time-frequency resource based on the inter-cell interference coordination. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to perform operating system functions based on the configuration of the device 405. For example, when the device 405 determines it has received beacon signal(s) from neighboring repeaters, the device 405 may perform ICIC or various other processing operations that may result in power savings and a reduction in processing complexities. Additionally, by using beacon signals from repeaters, device 405 may coordinate with other base stations within communication range of the repeater to reduce network interference and improve network functionality.

Figure 5:
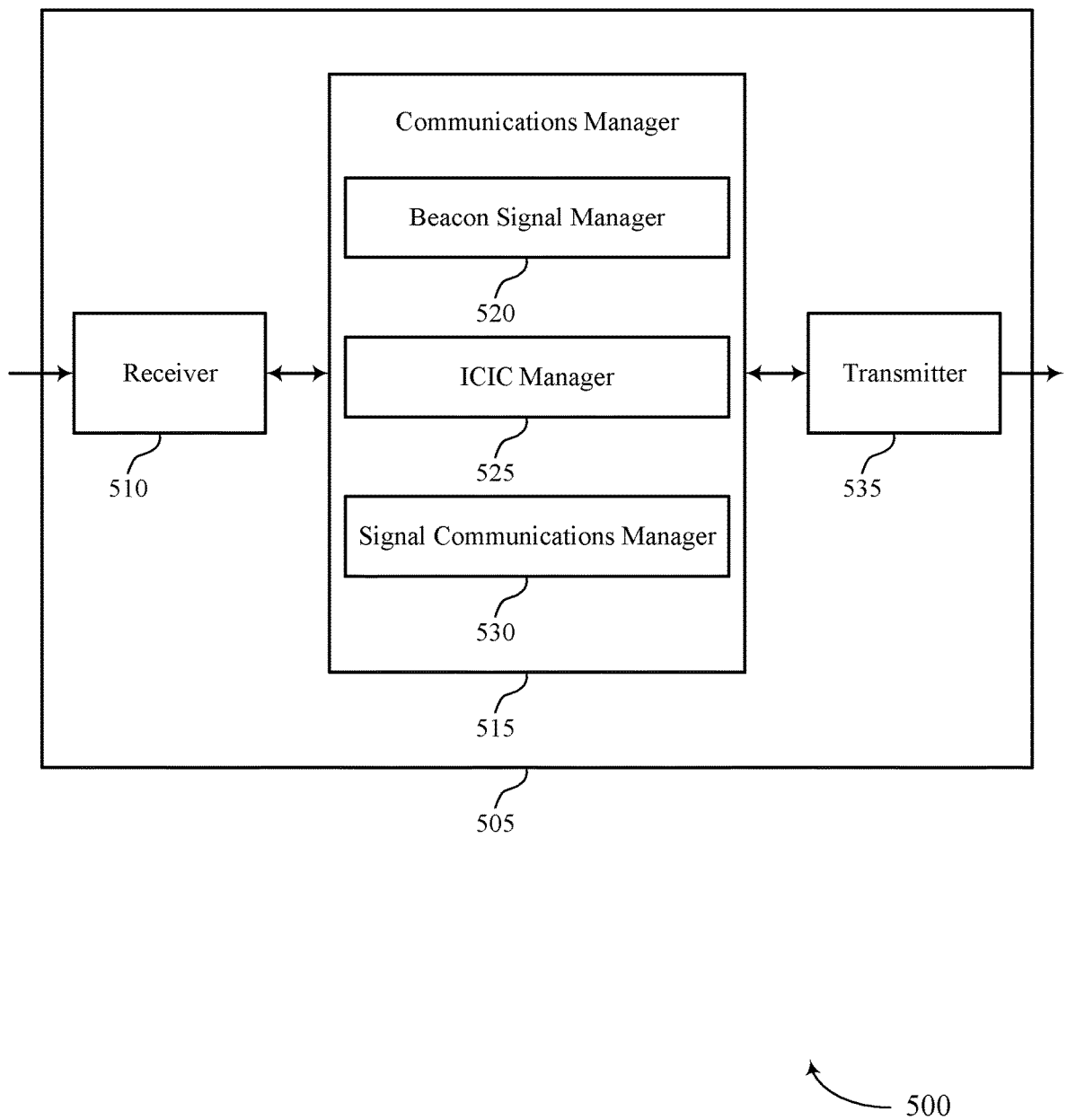

FIG. 5 shows a block diagram 500 of a device 505 that supports enabling repeater identification and inter-cell interference coordination support to reduce repeater based interference in accordance with aspects of the present disclosure. The device 505 may be an example of aspects of a device 405, or a base station 105 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to a repeater beacon signals for enabling inter-cell interference coordination, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a beacon signal manager 520, an ICIC manager 525, and a signal communications manager 530. The communications manager 515 may be an example of aspects of the communications manager 710 described herein.

The beacon signal manager 520 may receive, from a repeater, a beacon signal that indicates presence of the repeater that is repeating signals to one or more UEs within a wireless communications system.

The ICIC manager 525 may perform, in response to receiving the beacon signal, inter-cell interference coordination with one or more neighboring base stations that received the beacon signal to coordinate scheduling of a time-frequency resource.

The signal communications manager 530 may transmit a signal within the time-frequency resource based on the inter-cell interference coordination.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
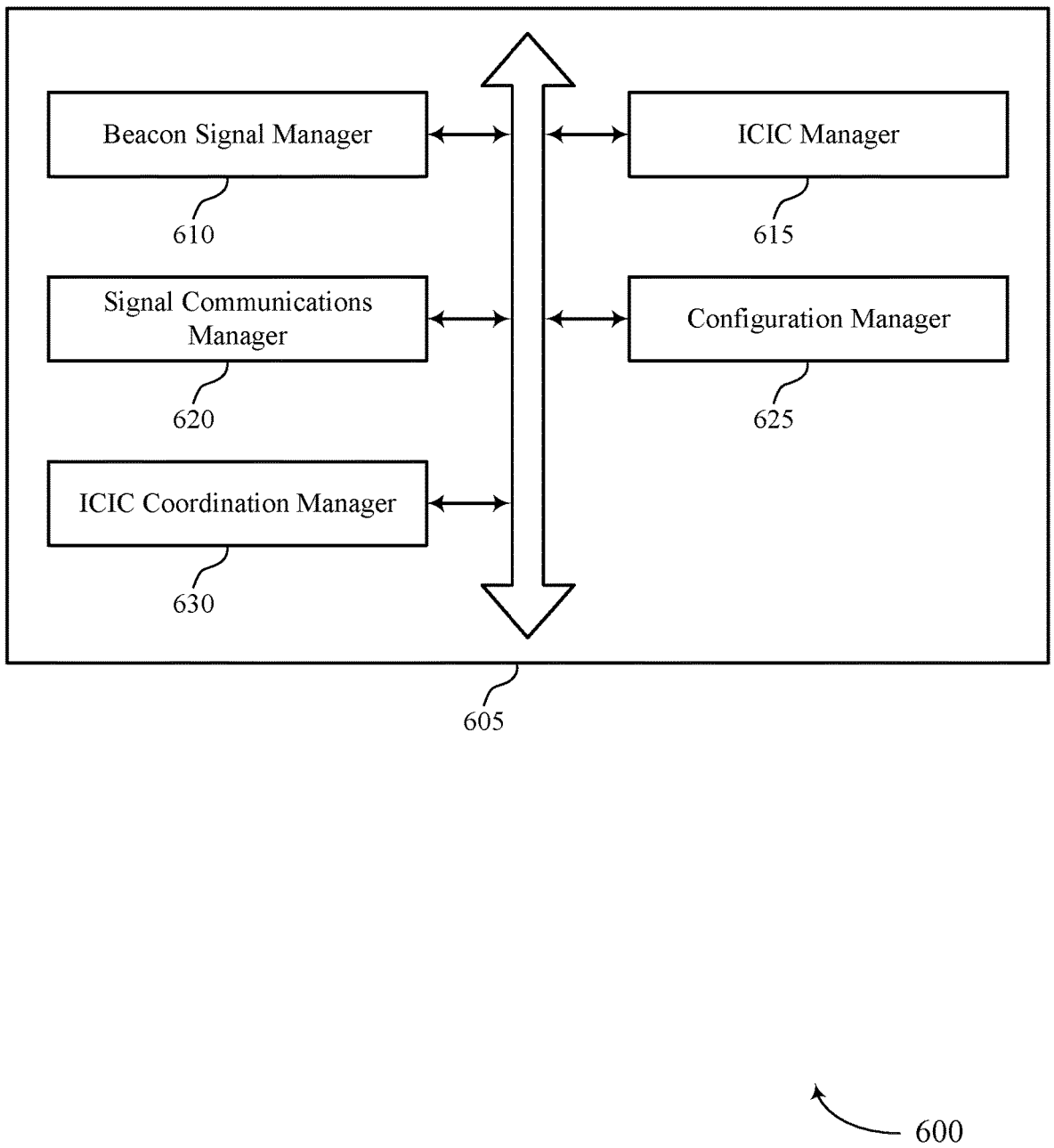
FIG. 6 shows a block diagram of a communications manager that supports a repeater beacon signal for enabling inter-cell interference coordination in accordance with aspects of the present disclosure.

FIG. 6 shows a block diagram 600 of a communications manager 605 that supports enabling repeater identification and inter-cell interference coordination support to reduce repeater based interference in accordance with aspects of the present disclosure. The communications manager 605 may be an example of aspects of a communications manager 415, a communications manager 515, or a communications manager 710 described herein. The communications manager 605 may include a beacon signal manager 610, an ICIC manager 615, a signal communications manager 620, a configuration manager 625, and an ICIC coordination manager 630. Each of these modules may communicate, directly or indirectly, with one another (e.g., via one or more buses).

The beacon signal manager 610 may receive, from a repeater, a beacon signal that indicates presence of the repeater that is repeating signals to one or more UEs within a wireless communications system.

The ICIC manager 615 may perform, in response to receiving the beacon signal, inter-cell interference coordination with one or more neighboring base stations that received the beacon signal to coordinate scheduling of a time-frequency resource.

The signal communications manager 620 may transmit a signal within the time-frequency resource based on the inter-cell interference coordination.

The configuration manager 625 may transmit a beacon configuration for transmission of the beacon signal, where the beacon signal is transmitted in accordance with the beacon configuration. In some examples, the configuration manager 625 may transmit the beacon configuration that indicates to transmit the beacon signal in accordance with a periodic schedule, an aperiodic schedule, or any combination thereof. In some examples, the configuration manager 625 may transmit the beacon configuration that indicates to transmit the beacon signal as at least one of an in-band transmission, or an out-of-band transmission, or any combination thereof. In some examples, the configuration manager 625 may transmit the beacon configuration that indicates to transmit the beacon signal as a RACH preamble within a RACH resource of a wireless communications system.

The ICIC coordination manager 630 may receive an indication from a first base station of the one or more neighboring base stations indicating that the first base station received the beacon signal from the repeater, where the inter-cell interference coordination is based on the received indication. In some examples, the ICIC coordination manager 630 may communicate one or more messages with the one or more neighboring base stations via at least one of a wired backhaul link, or a wireless backhaul link, or any combination thereof.

Figure 7:
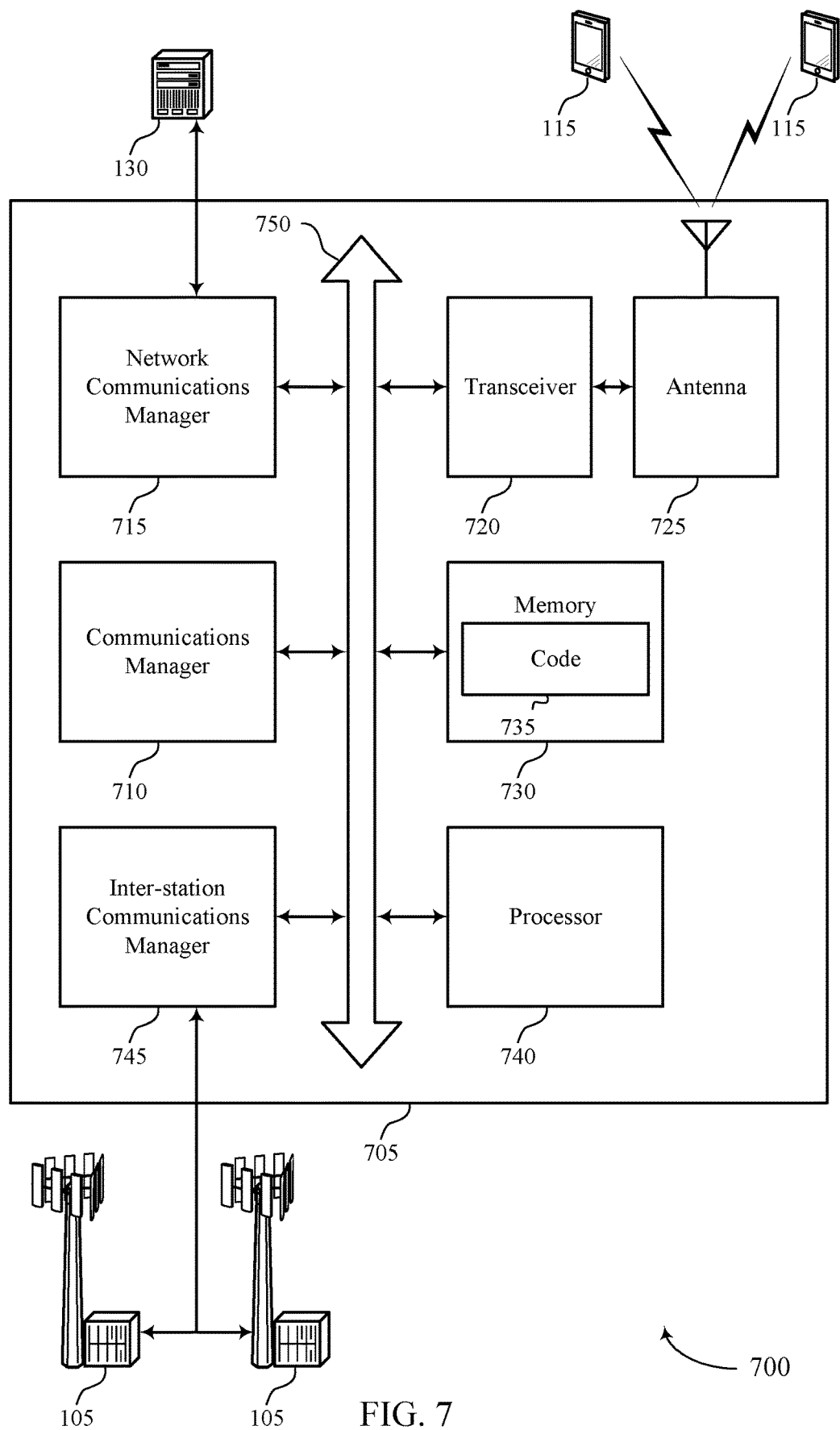
FIG. 7 shows a diagram of a system including a device that supports a repeater beacon signal for enabling inter-cell interference coordination in accordance with aspects of the present disclosure.

FIG. 7 shows a diagram of a system 700 including a device 705 that supports enabling repeater identification and inter-cell interference coordination support to reduce repeater based interference in accordance with aspects of the present disclosure. The device 705 may be an example of or include the components of device 405, device 505, or a base station 105 as described herein. The device 705 may include components for bi-directional voice and data communications including components for transmitting and receiving communications, including a communications manager 710, a network communications manager 715, a transceiver 720, an antenna 725, memory 730, a processor 740, and an inter-station communications manager 745. These components may be in electronic communication via one or more buses (e.g., bus 750).

The communications manager 710 may receive, from a repeater, a beacon signal that indicates presence of the repeater that is repeating signals to one or more UEs within a wireless communications system, perform, in response to receiving the beacon signal, inter-cell interference coordination with one or more neighboring base stations that received the beacon signal to coordinate scheduling of a time-frequency resource, and transmit, to the repeater for repeating to the one or more UEs within the time-frequency resource based on the inter-cell interference coordination.

The network communications manager 715 may manage communications with the core network (e.g., via one or more wired backhaul links). For example, the network communications manager 715 may manage the transfer of data communications for client devices, such as one or more UEs 115.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM, ROM, or a combination thereof. The memory 730 may store computer-readable code 735 including instructions that, when executed by a processor (e.g., the processor 740) cause the device to perform various functions described herein. In some cases, the memory 730 may contain, among other things, a basic input-output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some cases, a memory controller may be integrated into processor 740. The processor 740 may be configured to execute computer-readable instructions stored in a memory (e.g., the memory 730) to cause the device 705 to perform various functions (e.g., functions or tasks supporting a repeater beacon signals for enabling inter-cell interference coordination).

The inter-station communications manager 745 may manage communications with other base station 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communication network technology to provide communication between base stations 105.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
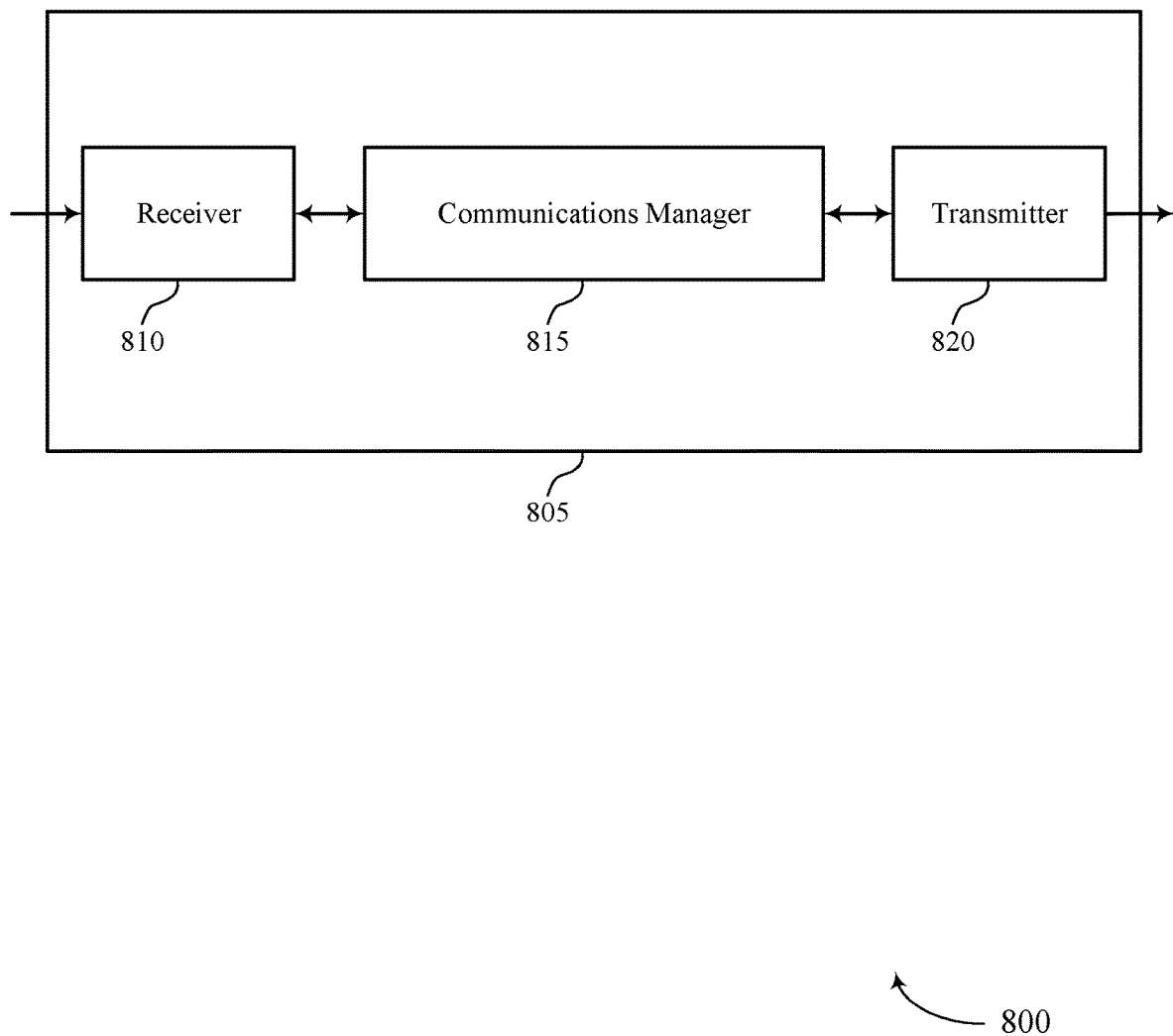
FIGS. 8 and 9 show block diagrams of devices that support a repeater beacon signal for enabling inter-cell interference coordination in accordance with aspects of the present disclosure.

FIG. 8 shows a block diagram 800 of a device 805 that supports enabling repeater identification and inter-cell interference coordination support to reduce repeater based interference in accordance with aspects of the present disclosure. The device 805 may be an example of aspects of a wireless device (e.g., a repeater) as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to repeater identification and inter-cell interference coordination support to reduce repeater based interference, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, by the repeater, a beacon signal that indicates a presence of the repeater that is repeating signals to one or more UEs within a wireless communications system, receive a signal from at least one base station within a time-frequency resource that is shared by a set of neighboring base stations in response to transmitting the beacon signal, and transmit an amplified version of the received signal to the one or more UEs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
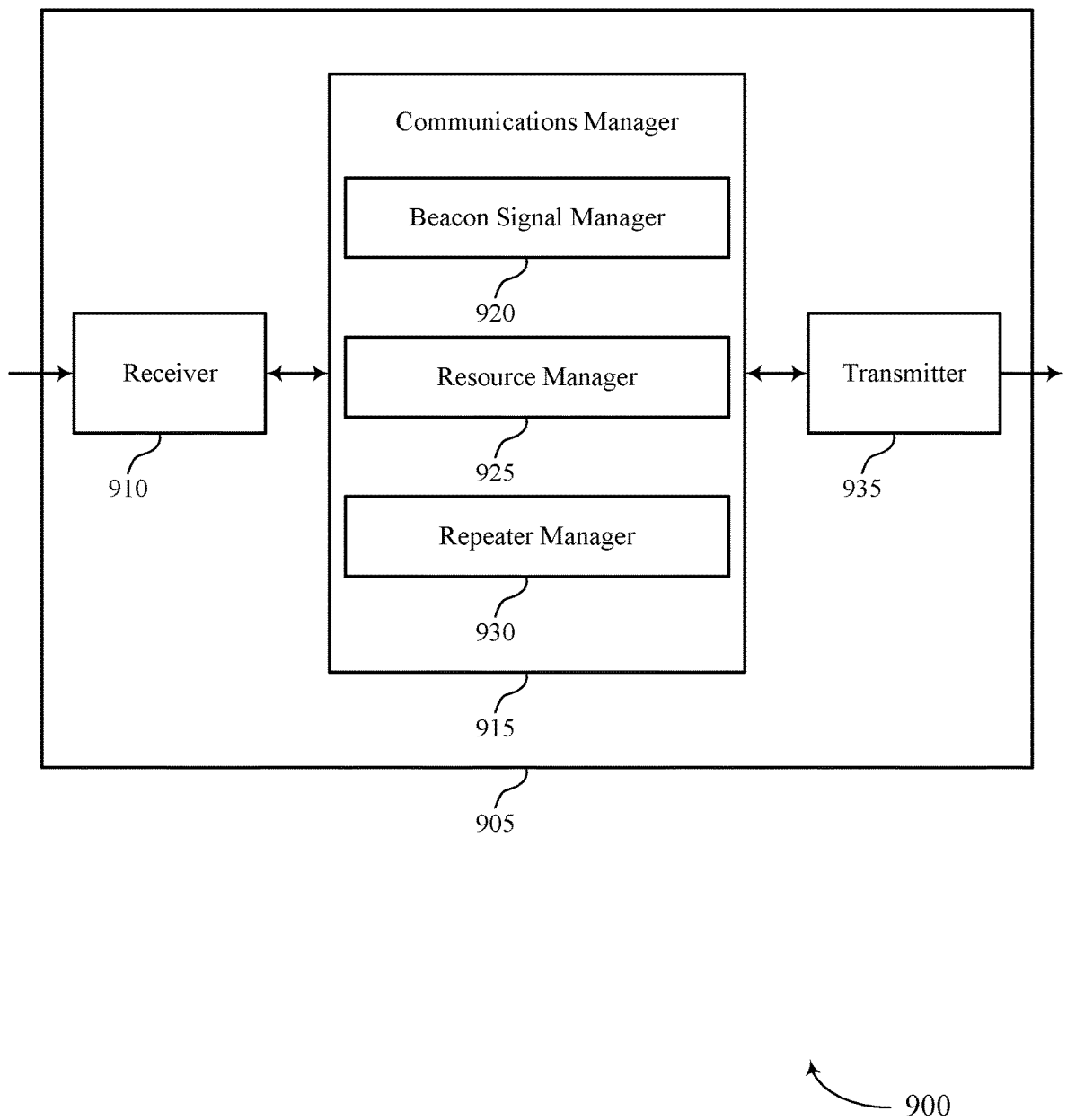

FIG. 9 shows a block diagram 900 of a device 905 that supports enabling repeater identification and inter-cell interference coordination support to reduce repeater based interference in accordance with aspects of the present disclosure. The device 905 may be an example of aspects of a device 805 or a wireless device (e.g., a repeater) as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to repeater identification and inter-cell interference coordination support to reduce repeater based interference, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a beacon signal manager 920, a resource manager 925, and a repeater manager 930. The communications manager 915 may be an example of aspects of the communications manager 1110 described herein.

The beacon signal manager 920 may transmit, by the repeater, a beacon signal that indicates a presence of the repeater that is repeating signals to one or more UEs within a wireless communications system.

The resource manager 925 may receive a signal from at least one base station within a time-frequency resource that is shared by a set of neighboring base stations in response to transmitting the beacon signal.

The repeater manager 930 may transmit an amplified version of the received signal to the one or more UEs.

The transmitter 920 may transmit signals generated by other components of the device 905. In some examples, the transmitter 920 may be collocated with a receiver 910 in a transceiver module. For example, the transmitter 920 may be an example of aspects of the transceiver 1120 described with reference to FIG. 11. The transmitter 920 may utilize a single antenna or a set of antennas.

Figure 10:
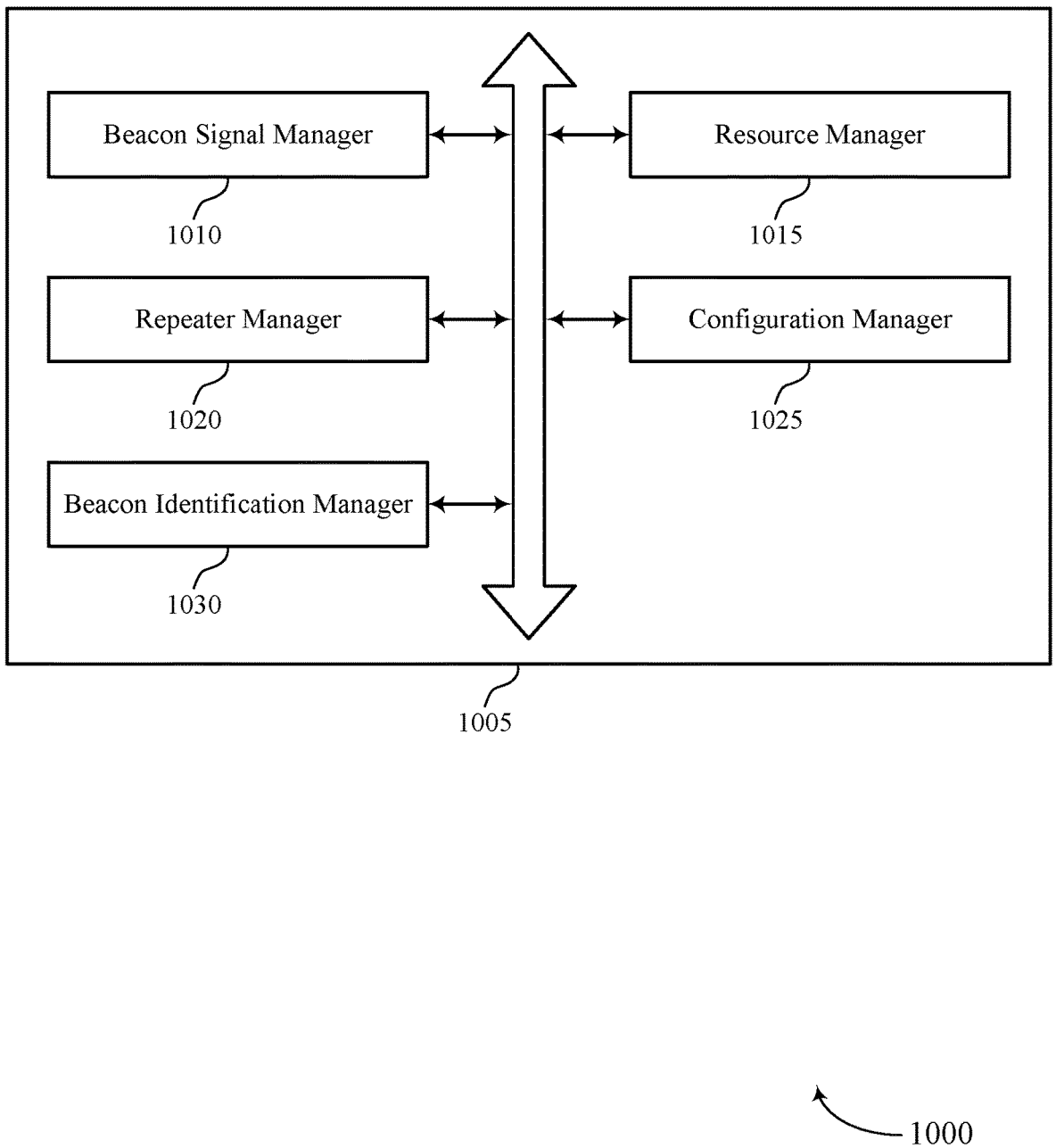
FIG. 10 shows a block diagram of a communications manager that supports a repeater beacon signal for enabling inter-cell interference coordination in accordance with aspects of the present disclosure.

FIG. 10 shows a block diagram 1000 of a communications manager 1005 that supports enabling repeater identification and inter-cell interference coordination support to reduce repeater based interference in accordance with aspects of the present disclosure. The communications manager 1005 may be an example of aspects of a communications manager 815, a communications manager 915, or a communications manager 1110 described herein. The communications manager 1005 may include a beacon signal manager 1010, a resource manager 1015, a repeater manager 1020, a configuration manager 1025, and a beacon identification manager 1030. Each of these modules may communicate, directly or indirectly, with one another (e.g., via one or more buses).

The beacon signal manager 1010 may transmit, by the repeater, a beacon signal that indicates a presence of the repeater that is repeating signals to one or more UEs within a wireless communications system.

The resource manager 1015 may receive a signal from at least one base station within a time-frequency resource that is shared by a set of neighboring base stations in response to transmitting the beacon signal.

The repeater manager 1020 may transmit an amplified version of the received signal to the one or more UEs. In some cases, the repeater is not configured to decode or process the received signal before transmission. In some cases, the repeater is configured to amplify and beamform the signal without coordination with the at least one base station or any of the plurality of neighboring base stations of the wireless communications system.

The configuration manager 1025 may receive a beacon configuration for transmission of the beacon signal, where the beacon signal is transmitted in accordance with the beacon configuration. In some examples, the configuration manager 1025 may receive the beacon configuration that indicates to transmit the beacon signal in accordance with a periodic schedule, an aperiodic schedule, or any combination thereof. In some examples, the configuration manager 1025 may receive the beacon configuration that indicates to transmit the beacon signal as at least one of an in-band transmission, or an out-of-band transmission, or any combination thereof. In some examples, the configuration manager 1025 may receive the beacon configuration that indicates to transmit the beacon signal as a RACH preamble within a RACH resource of the wireless communications system.

The beacon identification manager 1030 may transmit the beacon signal that includes an identifier associated with the repeater.

Figure 11:
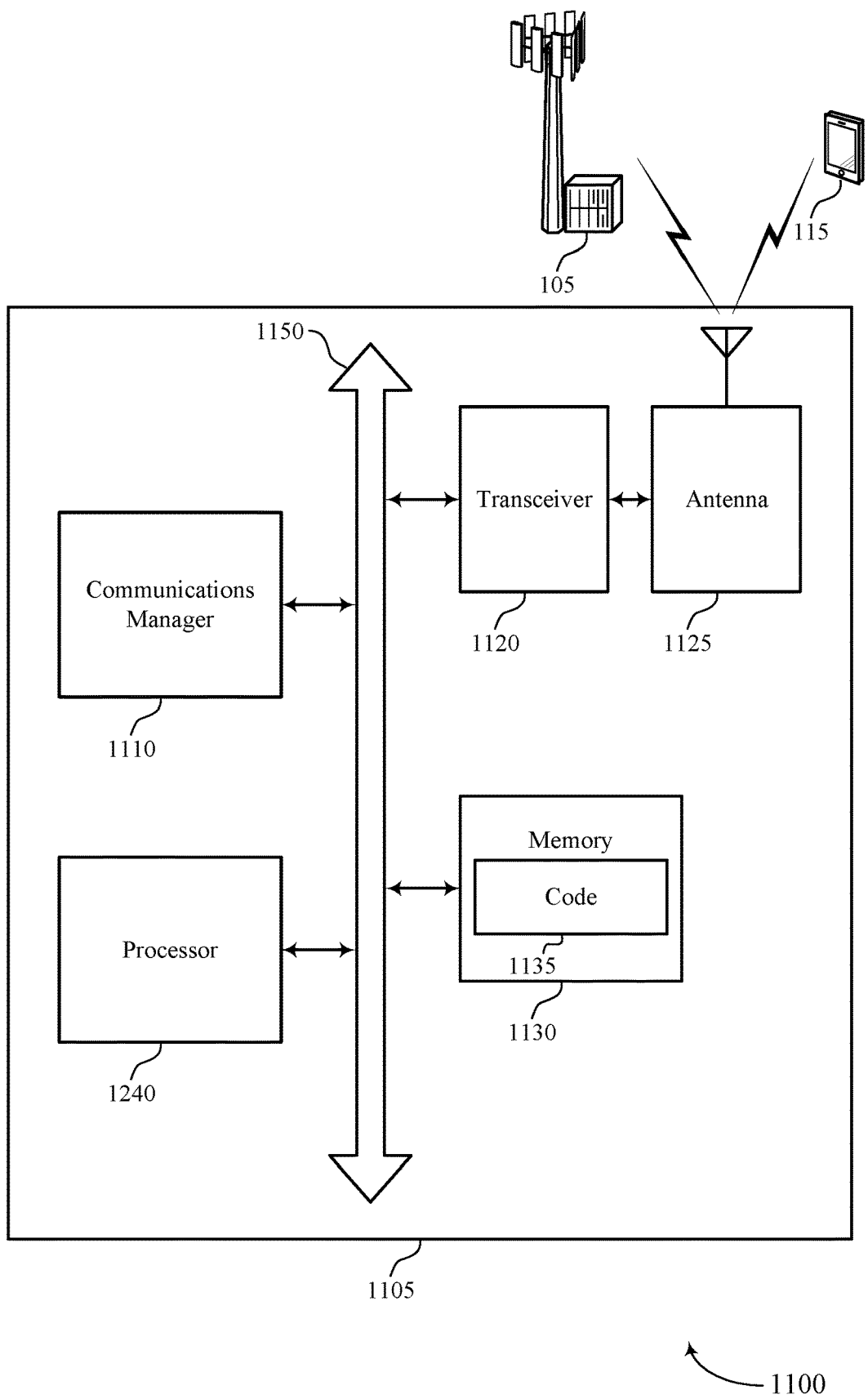
FIG. 11 shows a diagram of a system including a device that supports a repeater beacon signal for enabling inter-cell interference coordination in accordance with aspects of the present disclosure.

FIG. 11 shows a diagram of a system 1100 including a device 1105 that supports enabling repeater identification and inter-cell interference coordination support to reduce repeater based interference in accordance with aspects of the present disclosure. The device 1105 may be an example of or include the components of device 805, device 905, or a wireless device (e.g., a repeater) as described herein. The device 1105 may include components for bi-directional voice and data communications including components for transmitting and receiving communications, including a communications manager 1110, a transceiver 1120, an antenna 1125, memory 1130, and a processor 1140. These components may be in electronic communication via one or more buses (e.g., bus 1150).

The communications manager 1110 may transmit, by the repeater, a beacon signal that indicates a presence of the repeater that is repeating signals to one or more UEs within a wireless communications system, receive a signal from at least one base station within a time-frequency resource that is shared by a set of neighboring base stations in response to transmitting the beacon signal, and transmit an amplified version of the received signal to the one or more UEs.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. The transceiver 1120 may also support amplifying a signal received from one wireless device (such as base station 105), amplifying the signal, and then transmitting an amplified version of the signal to another device (such as UE 115).

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting smart repeater beamforming to reduce over-reach interference).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
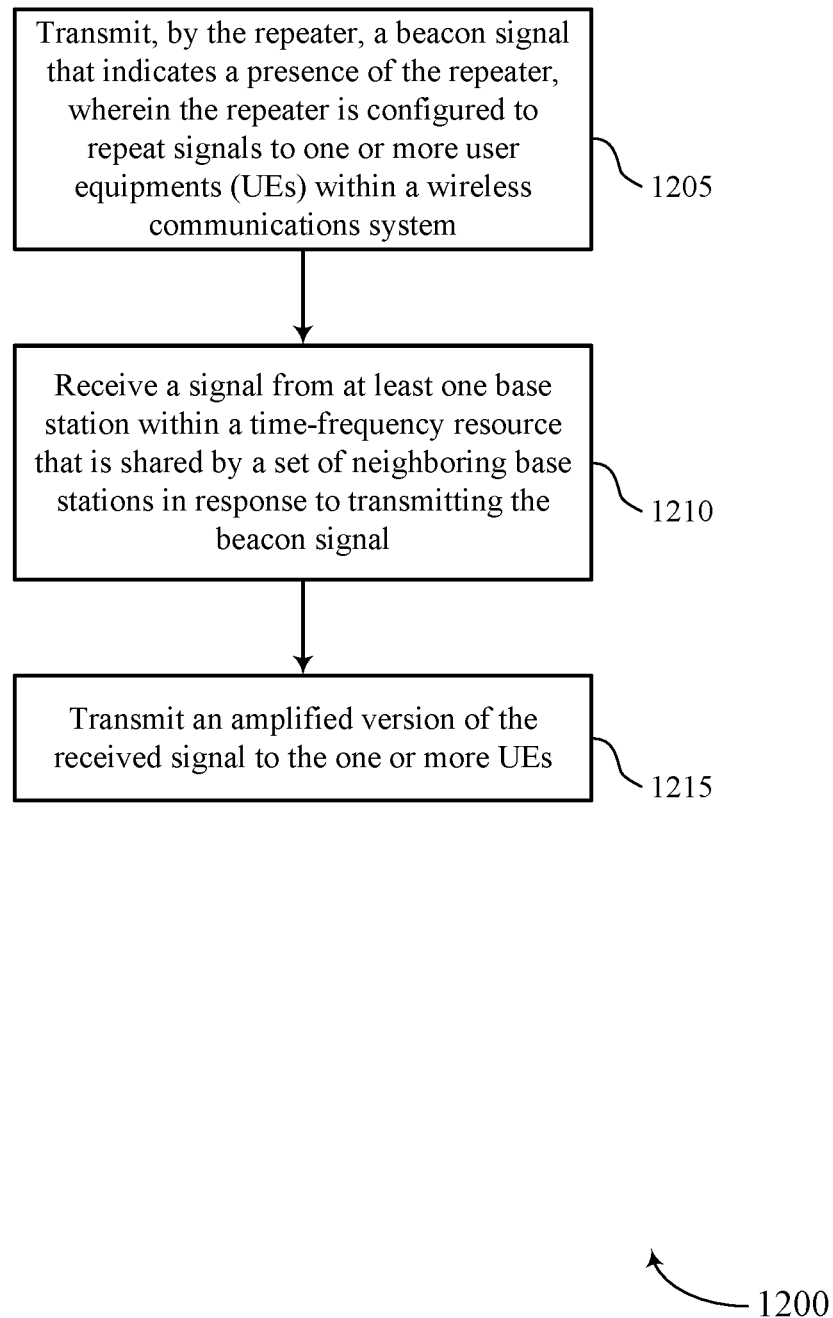
FIGS. 12 through 16 show flowcharts illustrating methods that support a repeater beacon signal for enabling inter-cell interference coordination in accordance with aspects of the present disclosure.

FIG. 12 shows a flowchart illustrating a method 1200 that supports enabling repeater identification and inter-cell interference coordination support to reduce repeater based interference in accordance with aspects of the present disclosure. The operations of method 1200 may be implemented by a wireless device (e.g., a repeater) or its components as described herein. For example, the operations of method 1200 may be performed by a communications manager as described with reference to FIGS. 8 through 11. In some examples, a wireless device may execute a set of instructions to control the functional elements of the wireless device to perform the functions described below. Additionally or alternatively, a wireless device may perform aspects of the functions described below using special-purpose hardware.

At 1205, the wireless device may transmit, by the repeater, a beacon signal that indicates a presence of the repeater, wherein the repeater is configured to repeat signals to one or more UEs within a wireless communications system. The operations of 1205 may be performed according to the methods described herein. In some examples, aspects of the operations of 1205 may be performed by a beacon signal manager as described with reference to FIGS. 8 through 11. Additionally or alternatively, means for performing 1205 may, but not necessarily, include, for example, antenna 1125, transceiver 1120, communications manager 1110, memory 1130 (including code 1135), processor 1140, and/or bus 1150.

At 1210, the wireless device may receive a signal from at least one base station within a time-frequency resource that is shared by a set of neighboring base stations in response to transmitting the beacon signal. The operations of 1210 may be performed according to the methods described herein. In some examples, aspects of the operations of 1210 may be performed by a resource manager as described with reference to FIGS. 8 through 11. Additionally or alternatively, means for performing 1210 may, but not necessarily, include, for example, antenna 1125, transceiver 1120, communications manager 1110, memory 1130 (including code 1135), processor 1140, and/or bus 1150.

At 1215, the wireless device may transmit an amplified version of the received signal to the one or more UEs. The operations of 1215 may be performed according to the methods described herein. In some examples, aspects of the operations of 1215 may be performed by a repeater manager as described with reference to FIGS. 8 through 11. Additionally or alternatively, means for performing 1215 may, but not necessarily, include, for example, antenna 1125, transceiver 1120, communications manager 1110, memory 1130 (including code 1135), processor 1140, and/or bus 1150.

Figure 13:
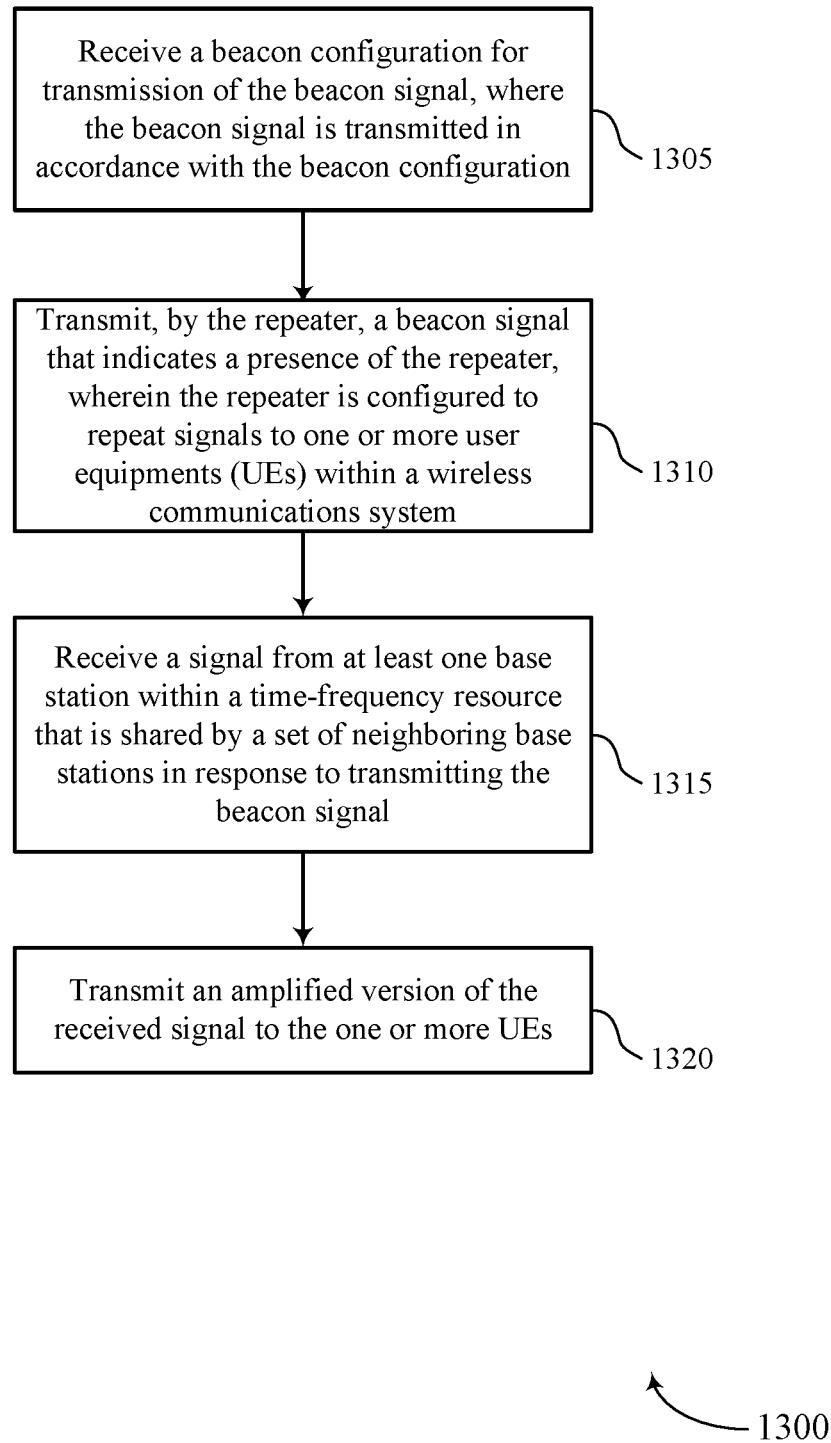

FIG. 13 shows a flowchart illustrating a method 1300 that supports enabling repeater identification and inter-cell interference coordination support to reduce repeater based interference in accordance with aspects of the present disclosure. The operations of method 1300 may be implemented by a wireless device (e.g., a repeater) or its components as described herein. For example, the operations of method 1300 may be performed by a communications manager as described with reference to FIGS. 8 through 11. In some examples, a wireless device may execute a set of instructions to control the functional elements of the wireless device to perform the functions described below. Additionally or alternatively, a wireless device may perform aspects of the functions described below using special-purpose hardware.

At 1305, the wireless device may receive a beacon configuration for transmission of the beacon signal, where the beacon signal is transmitted in accordance with the beacon configuration. The operations of 1305 may be performed according to the methods described herein. In some examples, aspects of the operations of 1305 may be performed by a configuration manager as described with reference to FIGS. 8 through 11. Additionally or alternatively, means for performing 1305 may, but not necessarily, include, for example, antenna 1125, transceiver 1120, communications manager 1110, memory 1130 (including code 1135), processor 1140, and/or bus 1150.

At 1310, the wireless device may transmit, by the repeater, a beacon signal that indicates a presence of the repeater, wherein the repeater is configured to repeat signals to one or more UEs within a wireless communications system. The operations of 1310 may be performed according to the methods described herein. In some examples, aspects of the operations of 1310 may be performed by a beacon signal manager as described with reference to FIGS. 8 through 11. Additionally or alternatively, means for performing 1310 may, but not necessarily, include, for example, antenna 1125, transceiver 1120, communications manager 1110, memory 1130 (including code 1135), processor 1140, and/or bus 1150.

At 1315, the wireless device may receive a signal from at least one base station within a time-frequency resource that is shared by a set of neighboring base stations in response to transmitting the beacon signal. The operations of 1315 may be performed according to the methods described herein. In some examples, aspects of the operations of 1315 may be performed by a resource manager as described with reference to FIGS. 8 through 11. Additionally or alternatively, means for performing 1315 may, but not necessarily, include, for example, antenna 1125, transceiver 1120, communications manager 1110, memory 1130 (including code 1135), processor 1140, and/or bus 1150.

At 1320, the wireless device may transmit an amplified version of the received signal to the one or more UEs. The operations of 1320 may be performed according to the methods described herein. In some examples, aspects of the operations of 1320 may be performed by a repeater manager as described with reference to FIGS. 8 through 11. Additionally or alternatively, means for performing 1320 may, but not necessarily, include, for example, antenna 1125, transceiver 1120, communications manager 1110, memory 1130 (including code 1135), processor 1140, and/or bus 1150.

Figure 14:
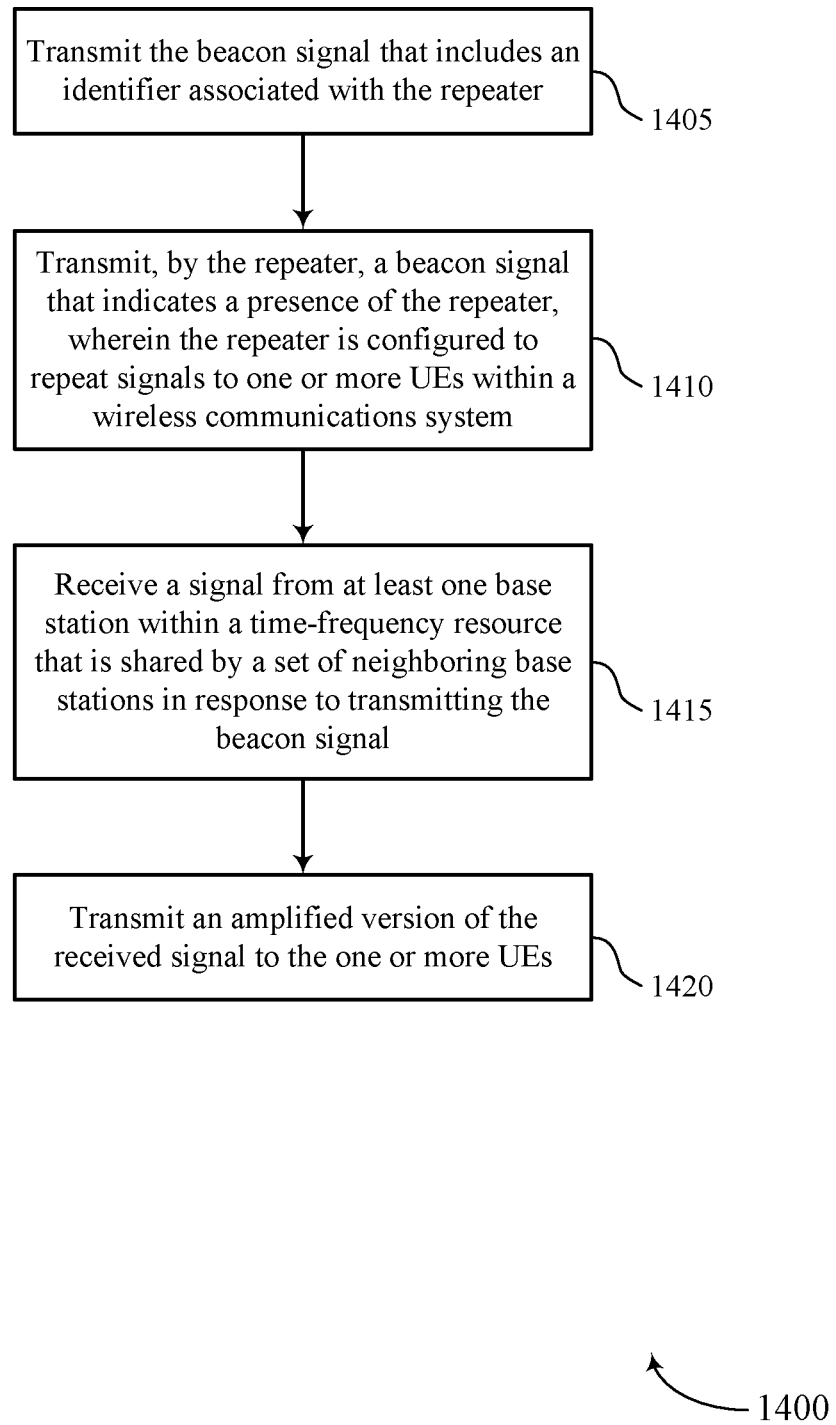

FIG. 14 shows a flowchart illustrating a method 1400 that supports enabling repeater identification and inter-cell interference coordination support to reduce repeater based interference in accordance with aspects of the present disclosure. The operations of method 1400 may be implemented by a wireless device (e.g., a repeater) or its components as described herein. For example, the operations of method 1400 may be performed by a communications manager as described with reference to FIGS. 8 through 11. In some examples, a wireless device may execute a set of instructions to control the functional elements of the wireless device to perform the functions described below. Additionally or alternatively, a wireless device may perform aspects of the functions described below using special-purpose hardware.

At 1405, the wireless device may transmit the beacon signal that includes an identifier associated with the repeater. The operations of 1405 may be performed according to the methods described herein. In some examples, aspects of the operations of 1405 may be performed by a beacon identification manager as described with reference to FIGS. 8 through 11. Additionally or alternatively, means for performing 1405 may, but not necessarily, include, for example, antenna 1125, transceiver 1120, communications manager 1110, memory 1130 (including code 1135), processor 1140, and/or bus 1150.

At 1410, the wireless device may transmit, by the repeater, a beacon signal that indicates a presence of the repeater, wherein the repeater is configured to repeat signals to one or more UEs within a wireless communications system. The operations of 1410 may be performed according to the methods described herein. In some examples, aspects of the operations of 1410 may be performed by a beacon signal manager as described with reference to FIGS. 8 through 11. Additionally or alternatively, means for performing 1410 may, but not necessarily, include, for example, antenna 1125, transceiver 1120, communications manager 1110, memory 1130 (including code 1135), processor 1140, and/or bus 1150.

At 1415, the wireless device may receive a signal from at least one base station within a time-frequency resource that is shared by a set of neighboring base stations in response to transmitting the beacon signal. The operations of 1415 may be performed according to the methods described herein. In some examples, aspects of the operations of 1415 may be performed by a resource manager as described with reference to FIGS. 8 through 11. Additionally or alternatively, means for performing 1415 may, but not necessarily, include, for example, antenna 1125, transceiver 1120, communications manager 1110, memory 1130 (including code 1135), processor 1140, and/or bus 1150.

At 1420, the wireless device may transmit an amplified version of the received signal to the one or more UEs. The operations of 1420 may be performed according to the methods described herein. In some examples, aspects of the operations of 1420 may be performed by a repeater manager as described with reference to FIGS. 8 through 11. Additionally or alternatively, means for performing 1420 may, but not necessarily, include, for example, antenna 1125, transceiver 1120, communications manager 1110, memory 1130 (including code 1135), processor 1140, and/or bus 1150.

Figure 15:
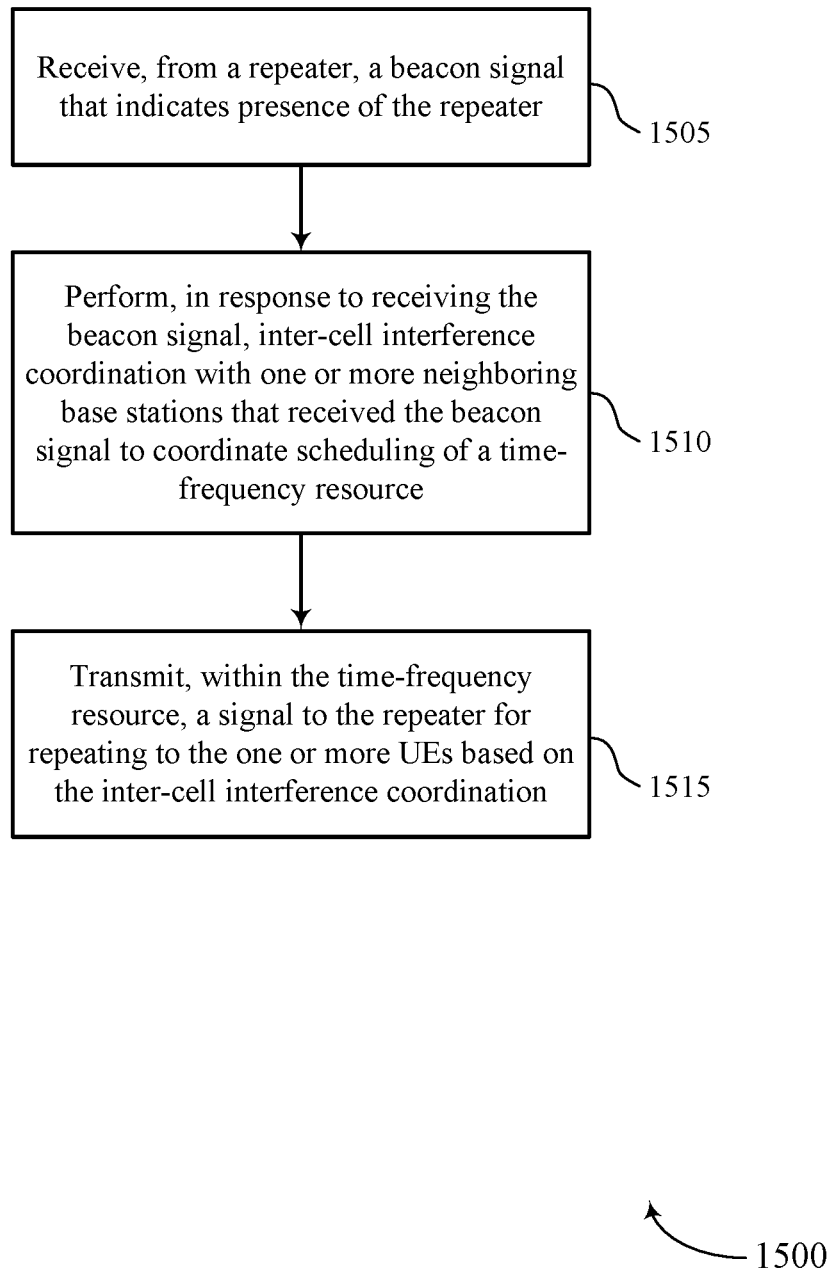

FIG. 15 shows a flowchart illustrating a method 1500 that supports enabling repeater identification and inter-cell interference coordination support to reduce repeater based interference in accordance with aspects of the present disclosure. The operations of method 1500 may be implemented by a base station 105 or its components as described herein. For example, the operations of method 1500 may be performed by a communications manager as described with reference to FIGS. 4 through 7. In some examples, a base station may execute a set of instructions to control the functional elements of the base station to perform the functions described below. Additionally or alternatively, a base station may perform aspects of the functions described below using special-purpose hardware. Additionally or alternatively, means for performing 1505 may, but not necessarily, include, for example, antenna 725, transceiver 720, communications manager 710, memory 730 (including code 735), processor 740, and/or bus 750.

At 1505, the base station may receive, from a repeater, a beacon signal that indicates presence of the repeater (e.g., that is repeating signals to one or more UEs within a wireless communications system). The operations of 1505 may be performed according to the methods described herein. In some examples, aspects of the operations of 1505 may be performed by a beacon signal manager as described with reference to FIGS. 4 through 7. Additionally or alternatively, means for performing 1505 may, but not necessarily, include, for example, antenna 725, transceiver 720, communications manager 710, memory 730 (including code 735), processor 740, and/or bus 750.

At 1510, the base station may perform, in response to receiving the beacon signal, inter-cell interference coordination with one or more neighboring base stations that received the beacon signal to coordinate scheduling of a time-frequency resource. The operations of 1510 may be performed according to the methods described herein. In some examples, aspects of the operations of 1510 may be performed by an ICIC manager as described with reference to FIGS. 4 through 7. Additionally or alternatively, means for performing 1510 may, but not necessarily, include, for example, antenna 725, transceiver 720, communications manager 710, memory 730 (including code 735), processor 740, and/or bus 750.

At 1515, the base station may transmit a signal within the time-frequency resource based on the inter-cell interference coordination. The operations of 1515 may be performed according to the methods described herein. In some examples, aspects of the operations of 1515 may be performed by a signal communications manager as described with reference to FIGS. 4 through 7. Additionally or alternatively, means for performing 1515 may, but not necessarily, include, for example, antenna 725, transceiver 720, communications manager 710, memory 730 (including code 735), processor 740, and/or bus 750.

Figure 16:
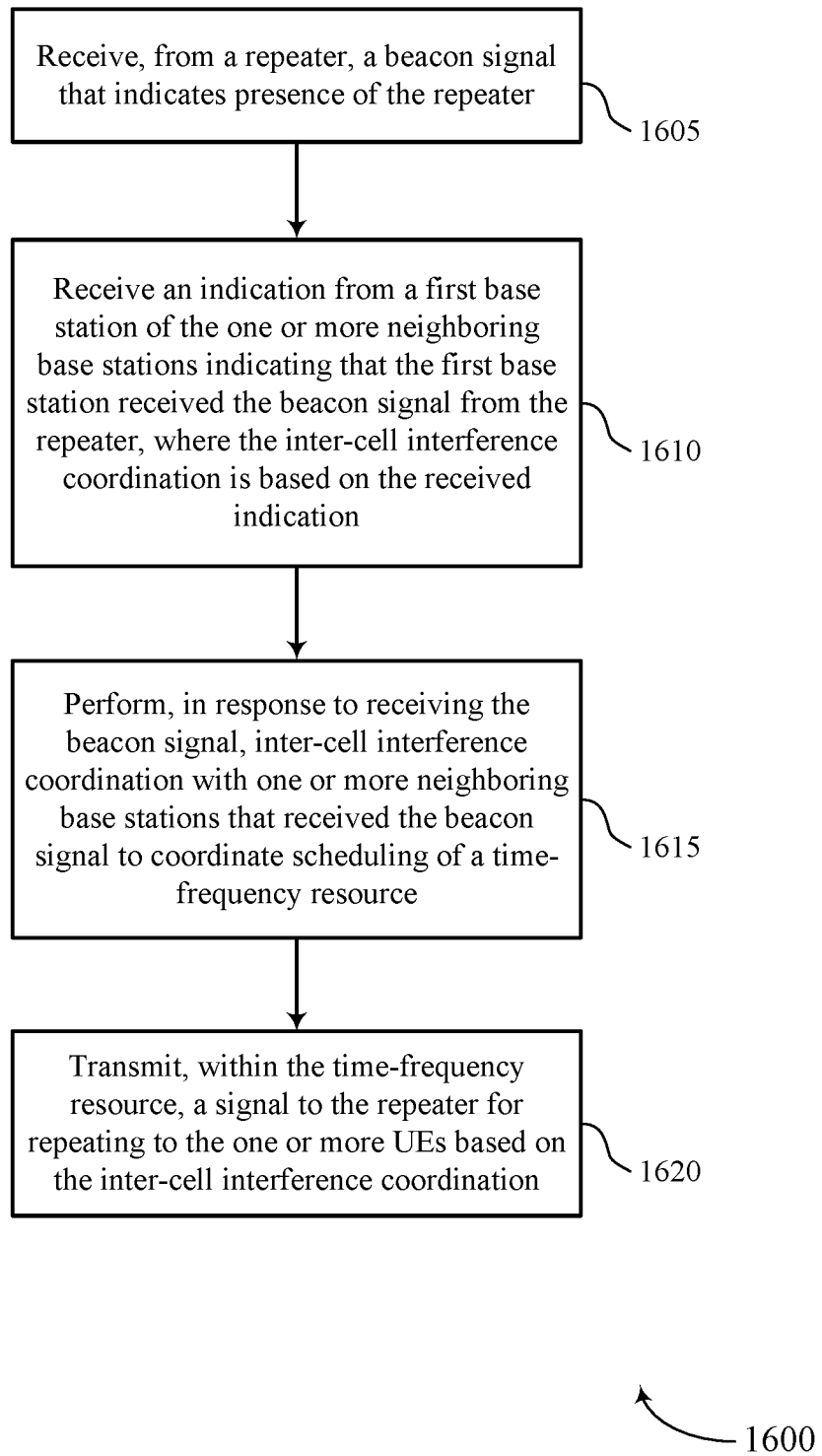

FIG. 16 shows a flowchart illustrating a method 1600 that supports enabling repeater identification and inter-cell interference coordination support to reduce repeater based interference in accordance with aspects of the present disclosure. The operations of method 1600 may be implemented by a base station 105 or its components as described herein. For example, the operations of method 1600 may be performed by a communications manager as described with reference to FIGS. 4 through 7. In some examples, a base station may execute a set of instructions to control the functional elements of the base station to perform the functions described below. Additionally or alternatively, a base station may perform aspects of the functions described below using special-purpose hardware.

At 1605, the base station may receive, from a repeater, a beacon signal that indicates presence of the repeater that is repeating signals to one or more UEs within a wireless communications system. The operations of 1605 may be performed according to the methods described herein. In some examples, aspects of the operations of 1605 may be performed by a beacon signal manager as described with reference to FIGS. 4 through 7. Additionally or alternatively, means for performing 1605 may, but not necessarily, include, for example, antenna 725, transceiver 720, communications manager 710, memory 730 (including code 735), processor 740, and/or bus 750.

At 1610, the base station may receive an indication from a first base station of the one or more neighboring base stations indicating that the first base station received the beacon signal from the repeater, where the inter-cell interference coordination is based on the received indication. The operations of 1610 may be performed according to the methods described herein. In some examples, aspects of the operations of 1610 may be performed by an ICIC coordination manager as described with reference to FIGS. 4 through 7. Additionally or alternatively, means for performing 1610 may, but not necessarily, include, for example, antenna 725, transceiver 720, communications manager 710, memory 730 (including code 735), processor 740, and/or bus 750.

At 1615, the base station may perform, in response to receiving the beacon signal, inter-cell interference coordination with one or more neighboring base stations that received the beacon signal to coordinate scheduling of a time-frequency resource. The operations of 1615 may be performed according to the methods described herein. In some examples, aspects of the operations of 1615 may be performed by an ICIC manager as described with reference to FIGS. 4 through 7. Additionally or alternatively, means for performing 1615 may, but not necessarily, include, for example, antenna 725, transceiver 720, communications manager 710, memory 730 (including code 735), processor 740, and/or bus 750.

At 1620, the base station may transmit a signal within the time-frequency resource based on the inter-cell interference coordination. The operations of 1620 may be performed according to the methods described herein. In some examples, aspects of the operations of 1620 may be performed by a signal communications manager as described with reference to FIGS. 4 through 7. Additionally or alternatively, means for performing 1620 may, but not necessarily, include, for example, antenna 725, transceiver 720, communications manager 710, memory 730 (including code 735), processor 740, and/or bus 750.

SUMMARY OF ASPECTS

The following provides an overview of aspects of the present disclosure:

Aspect 1: A method for wireless communication at a repeater, comprising: transmitting, by the repeater, a beacon signal that indicates a presence of the repeater, wherein the repeater is configured to repeat signals to one or more user equipments (UEs) within a wireless communications system; receiving a signal from at least one base station within a time-frequency resource that is shared by a plurality of neighboring base stations in response to transmitting the beacon signal; and transmitting an amplified version of the received signal to the one or more UEs.

Aspect 2: The method of aspect 1, further comprising: receiving a beacon configuration for transmission of the beacon signal, wherein the beacon signal is transmitted in accordance with the beacon configuration.

Aspect 3: The method of aspect 2, wherein receiving the beacon configuration further comprises: receiving the beacon configuration that indicates to transmit the beacon signal in accordance with a periodic schedule, an aperiodic schedule, or any combination thereof.

Aspect 4: The method of any of aspects 2 through 3, wherein receiving the beacon configuration further comprises: receiving the beacon configuration that indicates to transmit the beacon signal as at least one of an in-band transmission, or an out-of-band transmission, or any combination thereof.

Aspect 5: The method of any of aspects 2 through 4, wherein receiving the beacon configuration further comprises: receiving the beacon configuration that indicates to transmit the beacon signal as a RACH preamble within a RACH resource of the wireless communications system.

Aspect 6: The method of any of aspects 1 through 5, wherein transmitting the beacon signal comprises: transmitting the beacon signal that includes an identifier associated with the repeater.

Aspect 7: The method of any of aspects 1 through 6, wherein the repeater is not configured to decode or process the received signal before transmission.

Aspect 8: The method of any of aspects 1 through 7, wherein the repeater is configured to amplify and beamform the signal without coordination with the at least one base station or any of the plurality of neighboring base stations of the wireless communications system.

Aspect 9: A method for wireless communication at a base station, comprising: receiving, from a repeater, a beacon signal that indicates presence of the repeater; performing, in response to receiving the beacon signal, inter-cell interference coordination with one or more neighboring base stations that received the beacon signal to coordinate scheduling of a time-frequency resource; and transmitting, within the time-frequency resource, a signal to the repeater for repeating to one or more UEs based at least in part on the inter-cell interference coordination.

Aspect 10: The method of aspect 9, further comprising: transmitting a beacon configuration for transmission of the beacon signal, wherein the beacon signal is transmitted in accordance with the beacon configuration.

Aspect 11: The method of aspect 10, wherein transmitting the beacon configuration further comprises: transmitting the beacon configuration that indicates to transmit the beacon signal in accordance with a periodic schedule, an aperiodic schedule, or any combination thereof.

Aspect 12: The method of any of aspects 10 through 11, wherein transmitting the beacon configuration further comprises: transmitting the beacon configuration that indicates to transmit the beacon signal as at least one of an in-band transmission, or an out-of-band transmission, or any combination thereof.

Aspect 13: The method of any of aspects 10 through 12, wherein transmitting the beacon configuration further comprises: transmitting the beacon configuration that indicates to transmit the beacon signal as a RACH preamble within a RACH resource of a wireless communications system.

Aspect 14: The method of any of aspects 9 through 13, further comprising: receiving an indication from a first base station of the one or more neighboring base stations indicating that the first base station received the beacon signal from the repeater, wherein the inter-cell interference coordination is based at least in part on the received indication.

Aspect 15: The method of any of aspects 9 through 14, wherein performing the inter-cell interference coordination comprises: communicating one or more messages with the one or more neighboring base stations via at least one of a wired backhaul link, or a wireless backhaul link, or any combination thereof.

Aspect 16: An apparatus for wireless communication at a repeater, comprising a processor; memory coupled with the processor; and instructions stored in the memory and executable by the processor to cause the apparatus to perform a method of any of aspects 1 through 8.

Aspect 17: An apparatus for wireless communication at a repeater, comprising at least one means for performing a method of any of aspects 1 through 8.

Aspect 18: A non-transitory computer-readable medium storing code for wireless communication at a repeater, the code comprising instructions executable by a processor to perform a method of any of aspects 1 through 8.

Aspect 19: An apparatus for wireless communication at a base station, comprising a processor; memory coupled with the processor; and instructions stored in the memory and executable by the processor to cause the apparatus to perform a method of any of aspects 9 through 15.

Aspect 20: An apparatus for wireless communication at a base station, comprising at least one means for performing a method of any of aspects 9 through 15.

Aspect 21: A non-transitory computer-readable medium storing code for wireless communication at a base station, the code comprising instructions executable by a processor to perform a method of any of aspects 9 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a repeater, comprising:
   transmitting, by the repeater, a beacon signal to a plurality of network devices for inter-cell interference coordination between the plurality of network devices, the beacon signal indicating a presence of the repeater, wherein the repeater is configured to repeat signals to one or more user equipments (UEs) within a wireless communications system;
   receiving, in response to transmitting the beacon signal, a signal from at least one network device of the plurality of network devices within a time-frequency resource that is shared by the plurality of network devices and is allocated to the repeater based at least in part on the inter-cell interference coordination; and
   transmitting an amplified version of the received signal to the one or more UEs.

2. The method of claim 1, further comprising:
   receiving a beacon configuration for transmission of the beacon signal, wherein the beacon signal is transmitted in accordance with the beacon configuration.

3. The method of claim 2, wherein receiving the beacon configuration further comprises:
   receiving the beacon configuration that indicates to transmit the beacon signal in accordance with a periodic schedule, an aperiodic schedule, or any combination thereof.

4. The method of claim 2, wherein receiving the beacon configuration further comprises:
   receiving the beacon configuration that indicates to transmit the beacon signal as at least one of an in-band transmission, or an out-of-band transmission, or any combination thereof.

5. The method of claim 2, wherein receiving the beacon configuration further comprises:
   receiving the beacon configuration that indicates to transmit the beacon signal as a random access channel (RACH) preamble within a RACH resource of the wireless communications system.

6. The method of claim 1, wherein transmitting the beacon signal comprises:
   transmitting the beacon signal that includes an identifier associated with the repeater.

7. The method of claim 1, wherein the repeater is not configured to decode or process the received signal before transmission.

8. The method of claim 1, wherein the repeater is configured to amplify and beamform the signal without coordination with the at least one network device or any of the plurality of network devices of the wireless communications system.

9. A method for wireless communication at a network device, comprising:
   receiving, from a repeater, a beacon signal that indicates presence of the repeater;
   receiving an indication from a neighboring network device of one or more neighboring network devices indicating that the neighboring network device received the beacon signal from the repeater;
   performing, in response to receiving the beacon signal and the indication, inter-cell interference coordination with the neighboring network device to coordinate scheduling of a time-frequency resource for the repeater; and
   transmitting, within the time-frequency resource, a signal to the repeater for repeating to one or more user equipments (UEs) based at least in part on the inter-cell interference coordination.

10. The method of claim 9, further comprising:
    transmitting a beacon configuration for transmission of the beacon signal, wherein the beacon signal is transmitted in accordance with the beacon configuration.

11. The method of claim 10, wherein transmitting the beacon configuration further comprises:
    transmitting the beacon configuration that indicates to transmit the beacon signal in accordance with a periodic schedule, an aperiodic schedule, or any combination thereof.

12. The method of claim 10, wherein transmitting the beacon configuration further comprises:
    transmitting the beacon configuration that indicates to transmit the beacon signal as at least one of an in-band transmission, or an out-of-band transmission, or any combination thereof.

13. The method of claim 10, wherein transmitting the beacon configuration further comprises:
    transmitting the beacon configuration that indicates to transmit the beacon signal as a random access channel (RACH) preamble within a RACH resource of a wireless communications system.

14. The method of claim 9, wherein performing the inter-cell interference coordination comprises:
    communicating one or more messages with the one or more neighboring network devices via at least one of a wired backhaul link, or a wireless backhaul link, or any combination thereof.

15. An apparatus for wireless communication, comprising:
    memory;
    a transceiver; and
    at least one processor of a repeater, the at least one processor coupled with the memory and the transceiver, and the at least one processor configured to:
    transmit, by the repeater via the transceiver, a beacon signal to a plurality of network devices for inter-cell interference coordination between the plurality of network devices, the beacon signal indicating a presence of the repeater, wherein the repeater is configured to repeat signals to one or more user equipments (UEs) within a wireless communications system;

receive, via the transceiver in response to transmitting the beacon signal, a signal from at least one network device of the plurality of network devices within a time-frequency resource that is shared by the plurality of network devices and is allocated to the repeater based at least in part on the inter-cell interference coordination; and transmit, via the transceiver, an amplified version of the received signal to the one or more UEs.

16. The apparatus of claim 15, the at least one processor further configured to:

receive, via the transceiver, a beacon configuration for transmission of the beacon signal, wherein the beacon signal is transmitted in accordance with the beacon configuration.

17. The apparatus of claim 16, the at least one processor further configured to:

receive, via the transceiver, the beacon configuration that indicates to transmit the beacon signal in accordance with a periodic schedule, an aperiodic schedule, or any combination thereof.

18. The apparatus of claim 16, the at least one processor further configured to:

receive, via the transceiver, the beacon configuration that indicates to transmit the beacon signal as at least one of an in-band transmission, or an out-of-band transmission, or any combination thereof.

19. The apparatus of claim 16, the at least one processor further configured to:

receive, via the transceiver, the beacon configuration that indicates to transmit the beacon signal as a random access channel (RACH) preamble within a RACH resource of the wireless communications system.

20. The apparatus of claim 15, the at least one processor further configured to:

transmit, via the transceiver, the beacon signal that includes an identifier associated with the repeater.

21. The apparatus of claim 15, wherein the repeater is not configured to decode or process the received signal before transmission.

22. The apparatus of claim 15, wherein the repeater is configured to amplify and beamform the signal without coordination with the at least one network device or any of the plurality of network devices of the wireless communications system.

23. An apparatus for wireless communication, comprising:

memory; and at least one processor of a network device, the at least one processor coupled with the memory, and the at least one processor configured to:

receive, from a repeater, a beacon signal that indicates presence of the repeater;

receive an indication from a neighboring network device of one or more neighboring network devices indicating that the neighboring network device received the beacon signal from the repeater;

perform, in response to receiving the beacon signal and the indication, inter-cell interference coordination with the neighboring network device to coordinate scheduling of a time-frequency resource for the repeater; and transmit, within the time-frequency resource, a signal to the repeater for repeating to one or more user equipments (UEs) based at least in part on the inter-cell interference coordination.

24. The apparatus of claim 23, the at least one processor further configured to:

transmit a beacon configuration for transmission of the beacon signal, wherein the beacon signal is transmitted in accordance with the beacon configuration.

25. The apparatus of claim 24, the at least one processor further configured to:

transmit the beacon configuration that indicates to transmit the beacon signal in accordance with a periodic schedule, an aperiodic schedule, or any combination thereof.

26. The apparatus of claim 24, the at least one processor further configured to:

transmit the beacon configuration that indicates to transmit the beacon signal as at least one of an in-band transmission, or an out-of-band transmission, or any combination thereof.

27. The apparatus of claim 24, the at least one processor further configured to:

transmit the beacon configuration that indicates to transmit the beacon signal as a random access channel (RACH) preamble within a RACH resource of a wireless communications system.

28. The apparatus of claim 23, the at least one processor further configured to:

communicate one or more messages with the one or more neighboring network devices via at least one of a wired backhaul link, or a wireless backhaul link, or any combination thereof.

* * * * *